(12) United States Patent
Matsuya et al.

(10) Patent No.: US 10,253,665 B2
(45) Date of Patent: *Apr. 9, 2019

(54) HONEYCOMB STRUCTURE

(71) Applicant: NGK INSULATORS, LTD., Nagoya (JP)

(72) Inventors: Junki Matsuya, Nagoya (JP); Yasushi Kato, Nagoya (JP); Takahiro Kondo, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/401,224

(22) Filed: Jan. 9, 2017

(65) Prior Publication Data

US 2017/0204759 A1    Jul. 20, 2017

(30) Foreign Application Priority Data

Jan. 19, 2016  (JP) ................... 2016-007765

(51) Int. Cl.
*F01N 3/28*     (2006.01)
*F01N 3/022*    (2006.01)
(Continued)

(52) U.S. Cl.
CPC .......... *F01N 3/0222* (2013.01); *B01D 46/247* (2013.01); *B01D 53/9445* (2013.01);
(Continued)

(58) Field of Classification Search
CPC .... F01N 3/0222; F01N 3/2828; F01N 3/2842; F01N 2330/34; B01D 53/9445;
(Continued)

(56) References Cited

U.S. PATENT DOCUMENTS 7,655,195 B1   2/2010  Ichikawa et al.
2003/0167755 A1  9/2003  Nakatani et al.
(Continued)

FOREIGN PATENT DOCUMENTS

CN    101137599 A    3/2008
JP    H07-208873 A1  8/1995
(Continued)

OTHER PUBLICATIONS

U.S. Appl. No. 15/401,226, filed Jan. 9, 2017.
(Continued)

*Primary Examiner* — David Sample
*Assistant Examiner* — Elizabeth Collister
(74) *Attorney, Agent, or Firm* — Burr & Brown, PLLC

(57) ABSTRACT

A honeycomb structure having a quadrangular or triangular cross-sectional shape of cells and having specific open cells in which open changing portions are present only in a range of 20 mm or less from the first end face, and the open changing portion satisfies relations of $1 \le |(1-(D1/D2)) \times 100| \le 80$ and $1 \le |(1-(D3/D2)) \times 100| \le 80$. D1 indicates a diameter of an inscribed circle which comes in contact with a peripheral edge of the open end of the cell in the first end face. D2 indicates a diameter of the inscribed circle which comes in contact with the peripheral edge of the open end of the cell in the second end face. D3 indicates a diameter of an inscribed circle which comes in contact with a peripheral edge of the cell in a cross section perpendicular to a direction from the first end face toward the second end face.

9 Claims, 21 Drawing Sheets

(51) Int. Cl.
  *B01D 46/24* (2006.01)
  *B01D 53/94* (2006.01)

(52) U.S. Cl.
  CPC ......... *F01N 3/2828* (2013.01); *F01N 3/2842* (2013.01); *B01D 2046/2477* (2013.01); *B01D 2046/2481* (2013.01); *B01D 2046/2496* (2013.01); *B01D 2279/30* (2013.01); *F01N 2330/34* (2013.01); *Y02T 10/20* (2013.01)

(58) Field of Classification Search
  CPC .......... B01D 46/247; B01D 2046/2496; B01D 2046/2477; B01D 2046/2481; B01D 2279/30; Y02T 10/20
  USPC ....................................................... 428/116
  See application file for complete search history.

(56) References Cited

U.S. PATENT DOCUMENTS

2007/0178275 A1* 8/2007 Takahashi .......... B01D 46/2418
    428/116
2007/0264376 A1  11/2007 Souda
2009/0011176 A1   1/2009 Ichikawa
2009/0176053 A1*  7/2009 Miyairi .............. B01D 46/0001
    428/116

FOREIGN PATENT DOCUMENTS

| | | |
|---|---|---|
| JP | 3826277 B2 | 9/2006 |
| JP | 2007-302542 A1 | 11/2007 |
| JP | 2012-115744 A1 | 6/2012 |
| WO | 01/15877 A1 | 3/2001 |

OTHER PUBLICATIONS

Japanese Third Party Office of Information (Application No. 2016-007765) dated Dec. 27, 2018.

Chinese Office Action (Application No. 201710021610.3) dated Feb. 19, 2019.

* cited by examiner (a)

(b)

(a)

(b)

(a)

(b)

(a)

(b)

(a)

(b)

HONEYCOMB STRUCTURE

"The present application is an application based on JP-2016-007765 filed on Jan. 19, 2016 with Japan Patent Office, the entire contents of which are incorporated herein by reference."

BACKGROUND OF THE INVENTION

Field of the Invention

The present invention relates to a honeycomb structure. More particularly, it relates to a honeycomb structure in which it is possible to improve a purifying performance while inhibiting increase of pressure loss when using the honeycomb structure as an exhaust gas purifying catalyst carrier or filter.

Description of the Related Art

Honeycomb structures are broadly used in a catalyst carrier, a filter and the like, and are broadly used especially as a catalyst carrier, a filter and the like to purify or treat exhaust gases from internal combustion engines such as a gasoline engine and a diesel engine, and a burning device. Here, the honeycomb structure is a structure in the form of a honeycomb which includes porous partition walls defining a plurality of cells extending from a first end face to a second end face, and a circumferential wall.

In the honeycomb structure for use in the exhaust gas purifying catalyst carrier, filter or the like for a gasoline engine car, a diesel engine car or the like, improvement of a purifying performance is required to cope with yearly strengthened exhaust gas regulations from considerations for environmental problems. Furthermore, heretofore in this honeycomb structure, it has been considered to be preferable that the plurality of cells extending from the first end face to the second end face extend in parallel from the first end face toward the second end face to decrease pressure loss.

Here, in recent years, there has been suggested a honeycomb structure in which while increasing a surface area of partition walls, flow of fluid in cell passages is complicated to increase an interaction between the fluid and each partition wall (e.g., see Patent Documents 1 and 2).

[Patent Document 1] WO 01/015877
[Patent Document 2] JP-A-2012-115744

SUMMARY OF THE INVENTION

In a corrugated wall honeycomb structure described in Patent Document 1 and a honeycomb filter described in Patent Document 2, side surface portions of partition walls are formed into a corrugated shape. Consequently, it is possible to improve a purifying performance by an interaction between an exhaust gas and each partition wall, but there has been the problem that increase of pressure loss is remarkably large. Furthermore, in the above-mentioned corrugated wall honeycomb structure or the like, wall surface portions of the partition walls are formed into the corrugated shape along the whole surface and total length of the honeycomb structure, and hence there is the fear that decrease of a strength aspect might occur. Furthermore, in such a corrugated wave honeycomb structure or the like, its manufacturing method is laborious, and hence there has been the problem that productivity is low and manufacturing cost noticeably increases.

The present invention has been developed in view of such problems, and there is provided a honeycomb structure in which it is possible to improve a purifying performance while inhibiting increase of pressure loss when using the honeycomb structure as an exhaust gas purifying catalyst carrier or filter.

According to the present invention, there is provided a honeycomb structure described below.

According to a first aspect of the present invention, a honeycomb structure is provided including a pillar-shaped honeycomb structure body having porous partition walls defining a plurality of cells extending from a first end face to a second end face to become through channels for fluid, and a porous circumferential wall formed to surround a circumference of the honeycomb structure body, wherein in each of the plurality of cells excluding the cells formed at an outermost circumference, its cross-sectional shape is quadrangular or triangular, among the plurality of cells, the cells having open ends in a range of 1 to 80% of an area of the first end face of the honeycomb structure body are specific open cells, each of the specific open cells has an open changing portion, in the open changing portion, a diameter $D2$ of an inscribed circle which comes in contact with a peripheral edge of the open end of the cell in the second end face and a diameter $D1$ of an inscribed circle which comes in contact with a peripheral edge of the open end of the cell in the first end face satisfy a relation of $1 \leq |(1-(D1/D2)) \times 100| \leq 80$, and the diameter $D2$ of the inscribed circle which comes in contact with the peripheral edge of the open end of the cell in the second end face and a diameter $D3$ of an inscribed circle which comes in contact with a peripheral edge of the cell in a cross section perpendicular to a direction from the first end face toward the second end face satisfy a relation of $1 \leq |(1-(D3/D2)) \times 100| \leq 80$ in a range of a part of 20 mm or less from the first end face, the open changing portion of the specific open cell is present only in a range of the specific open cell which is 20 mm or less from the first end face, and among the plurality of cells, the cells other than the specific open cells are non-specific open cells which do not have the open changing portions and in which a size of an open end of each cell does not change or a change ratio in the open end of the cell is smaller than that in the open changing portion.

According to a second aspect of the present invention, the honeycomb structure according to the above first aspect is provided, wherein in the specific open cell, the diameter $D2$ of the inscribed circle which comes in contact with the peripheral edge of the open end of the cell in the second end face and a diameter $D3X$ of an inscribed circle which comes in contact with a peripheral edge of the cell of a range which is in excess of 20 mm from the first end face in the cross section perpendicular to the direction from the first end face toward the second end face satisfy a relation of $|(1-(D3X/D2)) \times 100| < 1$.

According to a third aspect of the present invention, the honeycomb structure according to the above first or second aspects is provided, wherein among the cells, the cells other than the specific open cells are normal cells, in each of the normal cells, the diameter $D2$ of the inscribed circle which comes in contact with the peripheral edge of the open end of the cell in the second end face and the diameter $D1$ of the inscribed circle which comes in contact with the peripheral edge of the open end of the cell in the first end face satisfy a relation of $|(1-(D1/D2)) \times 100| < 1$, and the diameter D2 of the inscribed circle which comes in contact with the peripheral edge of the open end of the cell in the second end face and the diameter D3 of the inscribed circle which comes in contact with the peripheral edge of the cell in the cross section perpendicular to the direction from the first end face toward the second end face satisfy a relation of $|(1-(D3/D2))\times 100<|$.

According to a fourth aspect of the present invention, the honeycomb structure according to any one of the above first to third aspects is provided, wherein among the plurality of cells, the cells having open ends in a range of 3 to 70% of the area of the first end face of the honeycomb structure body are the specific open cells.

According to a fifth aspect of the present invention, the honeycomb structure according to any one of the above first to fourth aspects is provided, wherein in the specific open cell, the diameter D2 of the inscribed circle and the diameter D1 of the inscribed circle satisfy a relation of $3\leq|(1-(D1/D2))\times 100|\leq 70$, and the diameter D2 of the inscribed circle and the diameter D3 of the inscribed circle in the open changing portion satisfy a relation of $3\leq|(1-(D3/D2))\times 100|\leq 70$.

According to a sixth aspect of the present invention, the honeycomb structure according to any one of the above first to fifth aspects is provided, wherein the diameter D2 of the inscribed circle is from 0.5 to 2.2 mm.

According to a seventh aspect of the present invention, the honeycomb structure according to any one of the above first to sixth aspects is provided, wherein a thickness of the partition walls is from 40 to 350 µm.

According to an eighth aspect of the present invention, the honeycomb structure according to any one of the above first to seventh aspects is provided, wherein a cell density of the honeycomb structure body is from 30 to 200 cells/cm$^2$.

According to a ninth aspect of the present invention, the honeycomb structure according to any one of the above first to eighth aspects is provided, wherein the partition walls are constituted by a material including at least one selected from the group consisting of cordierite, silicon carbide, a silicon-silicon carbide based composite material, mullite, alumina, aluminum titanate, silicon nitride, a cordierite forming raw material, lithium aluminum silicate, aluminum titanate, and a silicon carbide-cordierite based composite material.

In a honeycomb structure of the present invention, among a plurality of cells, the cells having open ends in a range of 1 to 80% of an area of a first end face of a honeycomb structure body are specific open cells each having such an open changing portion as described below. It is to be noted that in each of the plurality of cells excluding the cells formed at an outermost circumference, its cross-sectional shape is quadrangular or triangular. In the open changing portion of the specific open cell, a diameter D2 of an inscribed circle which comes in contact with a peripheral edge of the open end in the second end face and a diameter D1 of an inscribed circle which comes in contact with a peripheral edge of the open end in the first end face satisfy a relation of $1\leq|(1-(D1/D2))\times 100|\leq 80$. Furthermore, in this open changing portion of the specific open cell, the diameter D2 of the inscribed circle and a diameter D3 of an inscribed circle which comes in contact with a peripheral edge of the cell in a cross section perpendicular to a direction from the first end face toward the second end face satisfy a relation of $1\leq|(1-(D3/D2))\times 100|\leq 80$ in a range of a part of 20 mm or less from the first end face. Further, this open changing portion of the specific open cell is present only in a range of the specific open cell which is 20 mm or less from the first end face. When using the honeycomb structure of the present invention having such a constitution as an exhaust gas purifying catalyst carrier or filter, it is possible to improve a purifying performance while inhibiting increase of pressure loss. Furthermore, in the honeycomb structure of the present invention, the open changing portion in which a size of the open end of the specific open cell changes is present only in the range of 20 mm or less from the first end face, and hence it is possible to improve the purifying performance while remarkably effectively inhibiting the increase of the pressure loss. Furthermore, in the honeycomb structure of the present invention, its manufacturing is comparatively simple and contributes to improvement of productivity.

DESCRIPTION OF THE PREFERRED EMBODIMENTS

Hereinafter, embodiments of the present invention will be described, but the present invention is not limited to the following embodiments. Therefore, it should be understood that the following embodiments to which changes, improvements and the like are suitably added on the basis of ordinary knowledge of a person skilled in the art also fall in the scope of the present invention without departing from the gist of the present invention.

Figure 1:
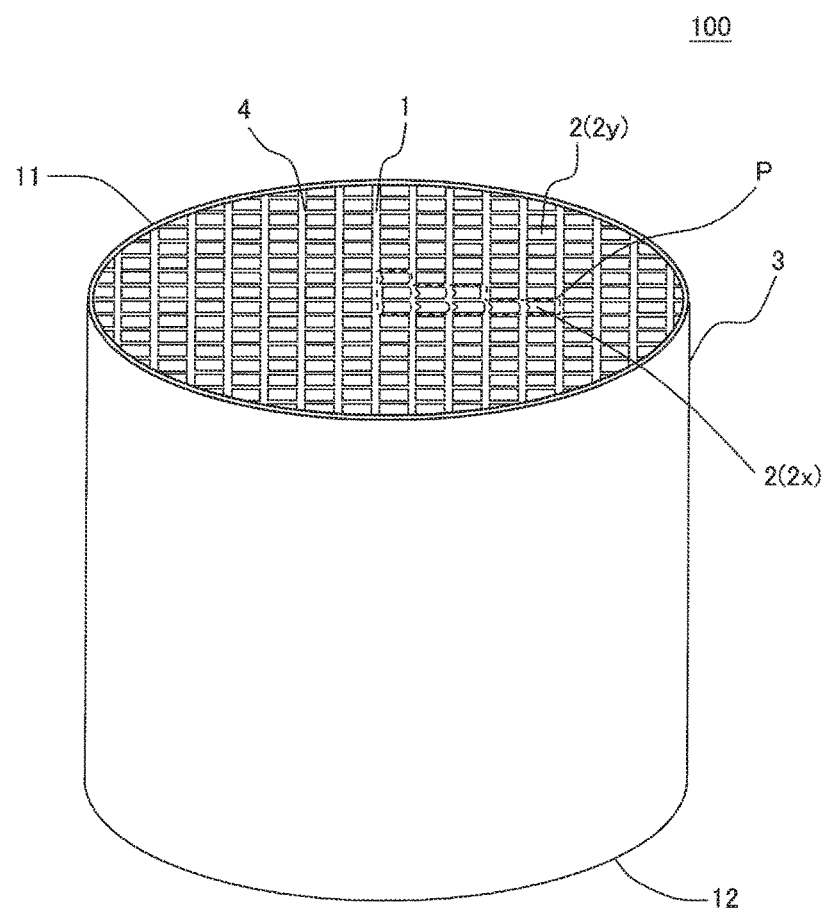
FIG. 1 is a perspective view schematically showing a first embodiment of a honeycomb structure of the present invention seen from a first end face side.
Figure 2:
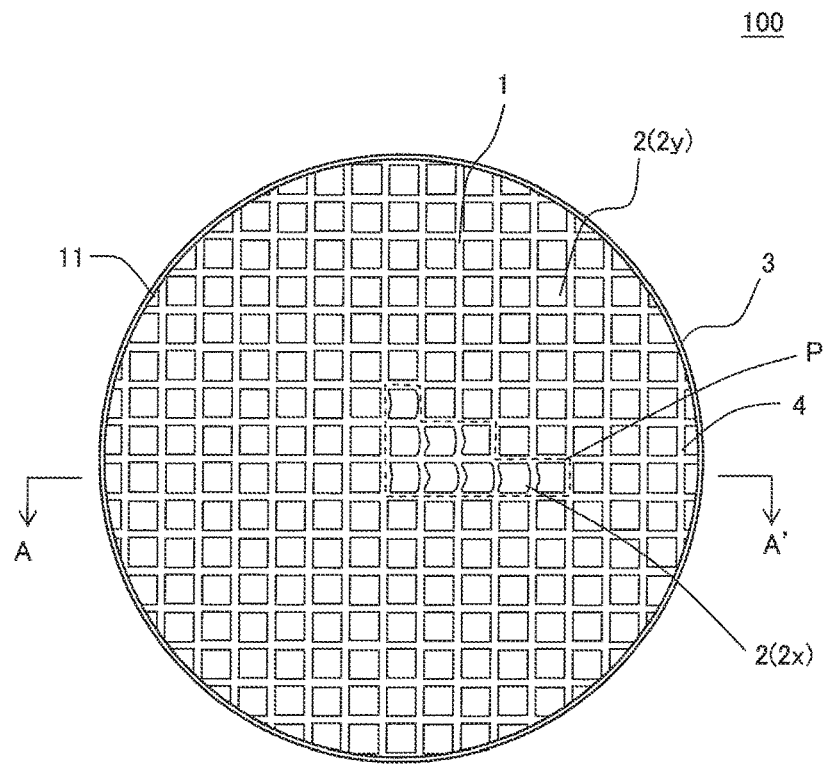
FIG. 2 is a plan view of the honeycomb structure shown in FIG. 1 and seen from the first end face side.
Figure 3:
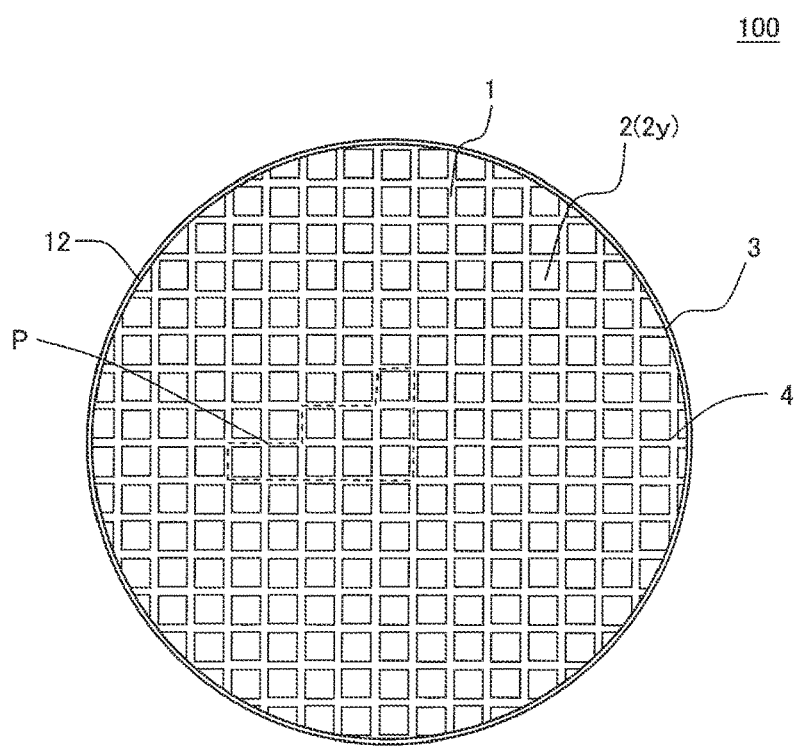
FIG. 3 is a plan view of the honeycomb structure shown in FIG. 1 and seen from a second end face side.
Figure 4:
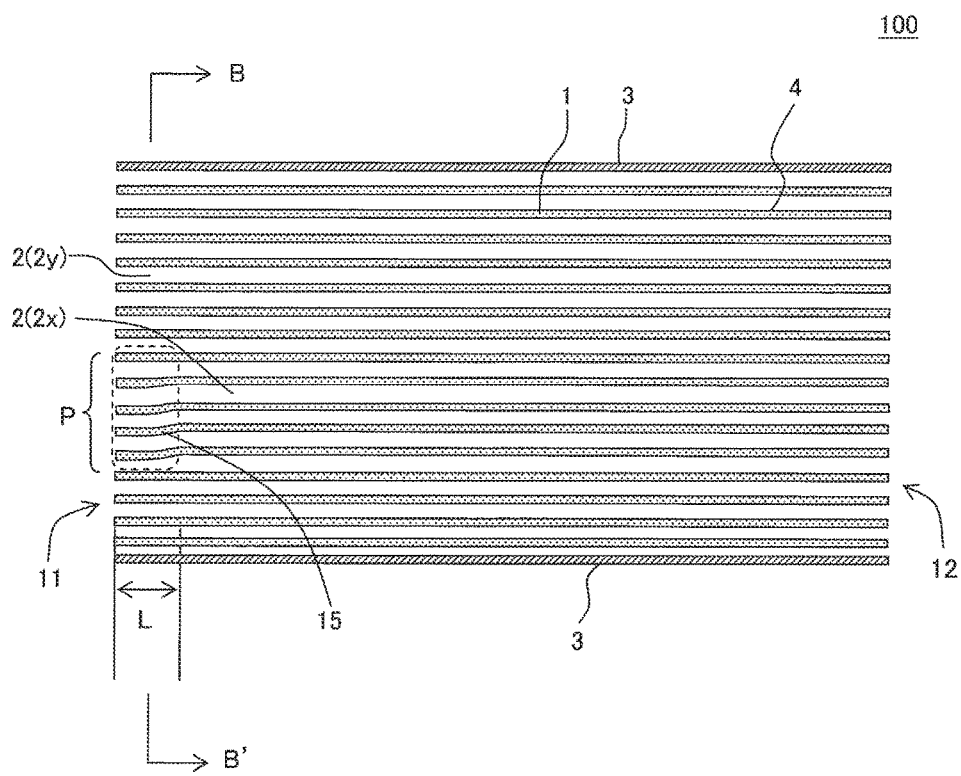
FIG. 4 is a cross-sectional view schematically showing a cross section taken along the A-A' line of FIG. 2.

(1) Honeycomb Structure:

A first embodiment of a honeycomb structure of the present invention is such a honeycomb structure 100 as shown in FIG. 1 to FIG. 4. The honeycomb structure 100 includes a pillar-shaped honeycomb structure body 4 having porous partition walls 1 defining a plurality of cells 2 extending from a first end face 11 to a second end face 12 to become through channels for fluid, and a porous circumferential wall 3 formed to surround a circumference of the honeycomb structure body 4. In each of the plurality of cells 2 excluding the cells formed at an outermost circumference, its cross-sectional shape is quadrangular or triangular, and the drawing shows an example of the quadrangular shape. Here, FIG. 1 is a perspective view schematically showing the first embodiment of the honeycomb structure of the present invention seen from a first end face side. FIG. 2 is a plan view of the honeycomb structure shown in FIG. 1 and seen from the first end face side. FIG. 3 is a plan view of the honeycomb structure shown in FIG. 1 and seen from a second end face side. FIG. 4 is a cross-sectional view schematically showing a cross section taken along the A-A' line of FIG. 2.

In the honeycomb structure 100 of the present embodiment, among the plurality of cells 2, the cells 2 having open ends in a range of 1 to 80% of an area of the first end face 11 of the honeycomb structure body 4 are specific open cells 2x constituted as follows. Here, in FIG. 1 to FIG. 3, a range in which the specific open cells 2x are formed is shown by a broken line denoted with sign P. Furthermore, in FIG. 4, the range in which the specific open cells 2x are formed is shown by a bracket denoted with sign P on a first end face 11 side.

Figure 5:
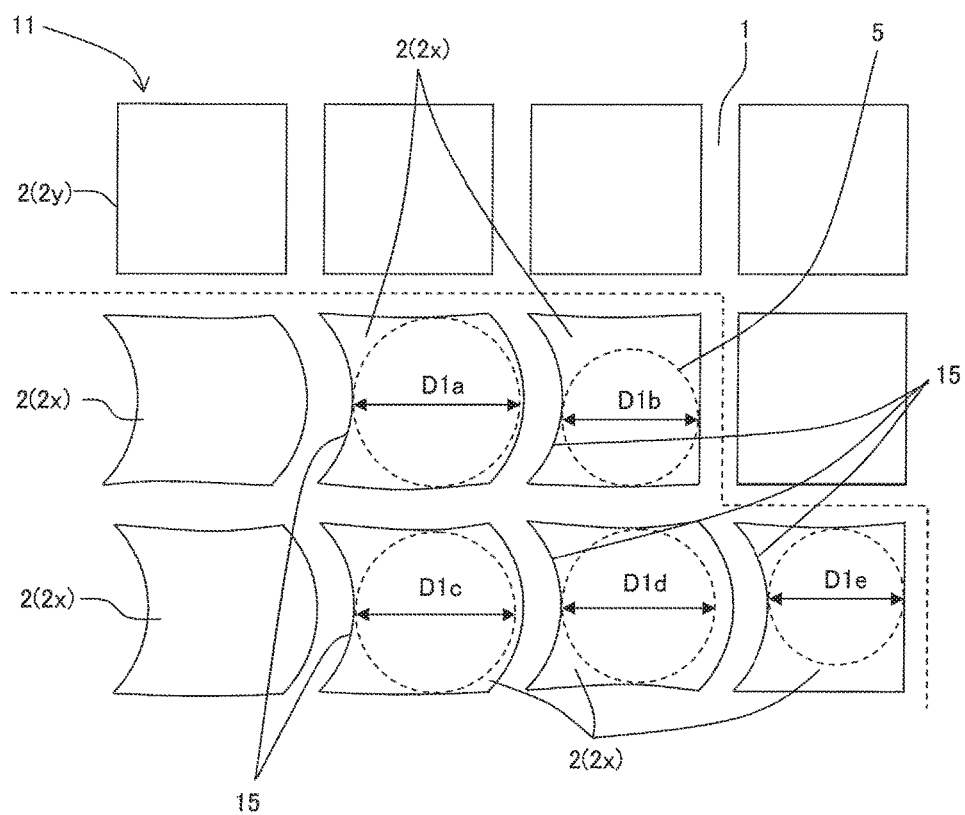
FIG. 5 is an enlarged schematic view showing an enlarged range surrounded with a broken line denoted with sign P of FIG. 2.
Figure 6:
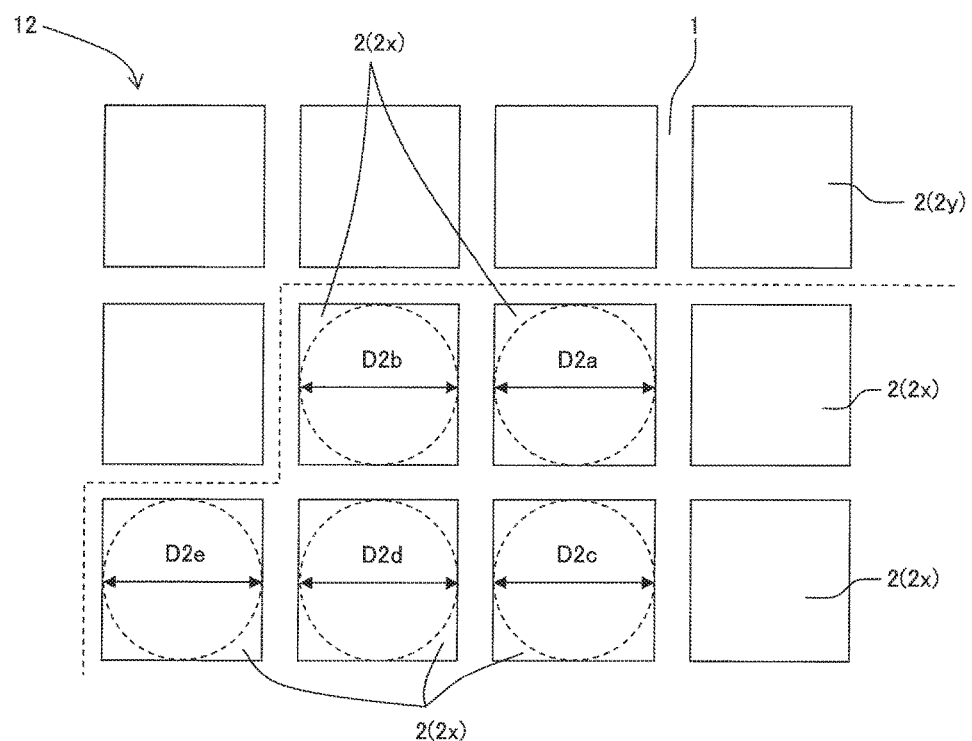
FIG. 6 is an enlarged schematic view showing an enlarged range surrounded with a broken line denoted with sign P of FIG. 3.
Figure 7:
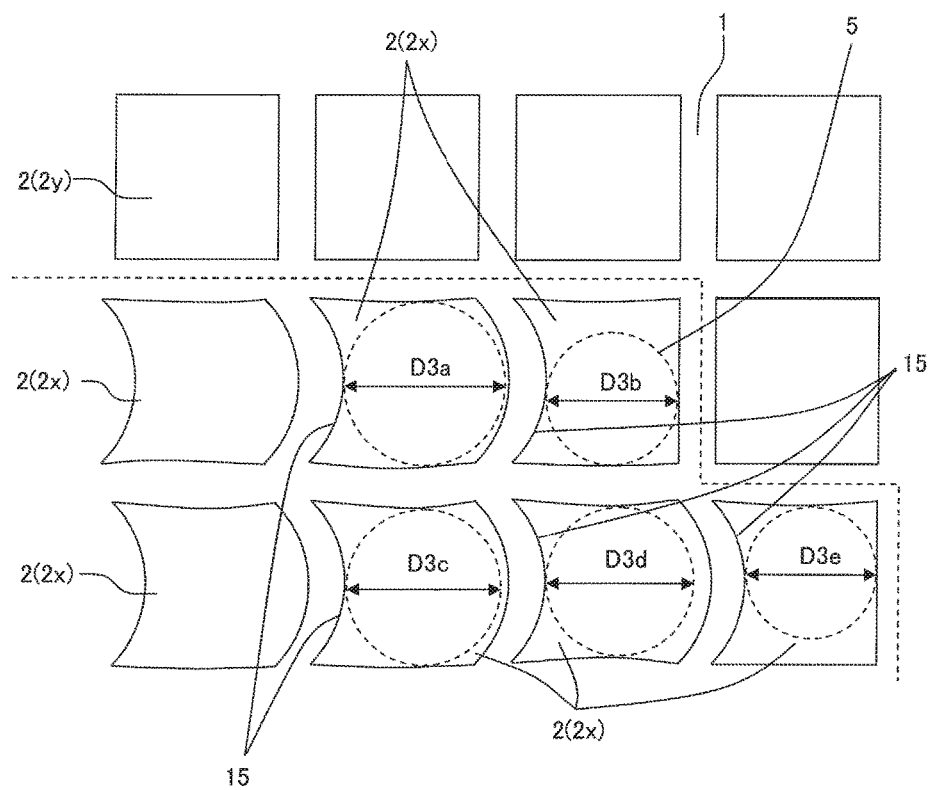
FIG. 7 is an enlarged schematic view showing an enlarged range denoted with sign P in a cross section taken along the B-B' line of FIG. 4.

A constitution of the specific open cell 2x will be described with reference to FIG. 5 to FIG. 7. FIG. 5 is an enlarged schematic view showing an enlarged range surrounded with a broken line denoted with sign P of FIG. 2. FIG. 6 is an enlarged schematic view showing an enlarged range surrounded with a broken line denoted with sign P of FIG. 3. FIG. 7 is an enlarged schematic view showing an enlarged range denoted with sign P in a cross section taken along the B-B' line of FIG. 4. That is, FIG. 5 is an enlarged schematic view of the first end face side of the honeycomb structure and FIG. 6 is an enlarged schematic view of the second end face side of the honeycomb structure. Further, FIG. 7 is an enlarged schematic view showing a range similar to the range shown in FIG. 5 in the cross section taken along the B-B' line of FIG. 4.

Here, in the description of the constitution of the specific open cell 2x, there is defined a diameter of an inscribed circle which comes in contact with a peripheral edge of an open end of the cell 2 as described below. First, the diameter of the inscribed circle which comes in contact with the peripheral edge of the open end of the cell 2 in the first end face 11 is defined as a diameter D1. Furthermore, the diameter of the inscribed circle which comes in contact with the peripheral edge of the open end of the cell 2 in the second end face 12 is defined as a diameter D2. It is to be noted that hereinafter, in a case of referring to "the diameter D1 of the inscribed circle" of the cell 2, there is meant "the diameter D1 of the inscribed circle which comes in contact with the peripheral edge of the open end" of the cell 2 "in the first end face 11". Furthermore, in a case of referring to "the diameter D2 of the inscribed circle", there is meant "the diameter D2 of the inscribed circle which comes in contact with the peripheral edge of the open end" of the cell 2 "in the second end face 12". Furthermore, when a plurality of specific open cells 2x are present in the first end face 11, there is a case where the diameter D1 of the inscribed circle of one specific open cell 2x is defined as a diameter D1a and the diameters D1 of the inscribed circles of the other specific open cells 2x are successively defined as a diameter D1b, a diameter D1c, a diameter D1d and the like. Similarly, there is a case where the diameters D2 of the inscribed circles of the corresponding specific open cells 2x in the second end face 12 are successively defined as a diameter D2a, a diameter D2b, a diameter D2c, a diameter D2d and the like.

Furthermore, in the description of the constitution of the specific open cell 2x, a diameter of an inscribed circle which comes in contact with a peripheral edge of the cell in a range of the cell 2 which is 20 mm or less from the first end face 11 (see FIG. 4) is defined as follows. A diameter of an inscribed circle which comes in contact with a peripheral edge of the cell in the range of the cell 2 which is 20 mm or less from the first end face 11 (see FIG. 4) is defined as a diameter D3. Hereinafter, in a case of referring to "the diameter D3 of the inscribed circle" of the cell 2, there is meant "the diameter D3 of the inscribed circle which comes in contact with the peripheral edge of the cell in the range of 20 mm or less from the first end face 11" of the cell 2. Furthermore, when a plurality of specific open cells 2x are present, there is a case where the diameters D3 of the inscribed circle of one specific open cell 2x are successively defined as a diameter D3a, a diameter D3b, a diameter D3c, a diameter D3d and the like. Here, in FIG. 5, the diameters D1 of the inscribed circles of five specific open cells 2x are shown in sizes of arrows denoted with signs D1a, D1b, D1c, D1d, and D1e. In FIG. 6, the diameters D2 of the inscribed circles of five specific open cells 2x are shown in sizes of arrows denoted with signs D2a, D2b, D2c, D2d, and D2e. In FIG. 7, the diameters D3 of the inscribed circles of five specific open cells 2x are shown in sizes of arrows denoted with signs D3a, D3b, D3c, D3d, and D3e.

As shown in FIG. 4, the specific open cell 2x has an open changing portion 15 constituted so that a size of the open end on the first end face 11 side is different from a size of the open end of the specific open cell 2x on a second end face 12 side. The open changing portion 15 is constituted as follows. As shown in FIG. 5, first, in the specific open cell 2x, the diameter D2 of the inscribed circle of the specific open cell 2x and the diameter D1 of the inscribed circle of the specific open cell 2x satisfy a relation of $1 \le |(1-(D1/D2)) \times 100| \le 80$. That is, in the specific open cell 2x, an absolute value of a percentage of a value (a difference) obtained by subtracting the diameter D1 of the inscribed circle from the diameter D2 of the inscribed circle, to the diameter D2 of the inscribed circle, is from 1 to 80%. Hereinafter, "the absolute value of the percentage of the value (the difference) obtained by subtracting the diameter D1 of the inscribed circle from the diameter D2 of the inscribed circle, to the diameter D2 of the inscribed circle" will be referred to as "a maximum inscribed circle change ratio" sometimes. That is, the value (the absolute value) indicated by $|(1-(D1/D2)) \times 100|$ is "the maximum inscribed circle change ratio".

Furthermore, in the specific open cell 2x, the diameter D2 of the inscribed circle of the specific open cell 2x and the diameter D3 of the inscribed circle of the specific open cell 2x satisfy a relation of $1 \le |(1-(D3/D2)) \times 100| \le 80$ in a range of a part of 20 mm or less from the first end face 11. That is, in the specific open cell 2x, an absolute value of a percentage of a value (a difference) obtained by subtracting the diameter D3 of the inscribed circle from the diameter D2 of the inscribed circle, to the diameter D2 of the inscribed circle, is from 1 to 80%. Hereinafter, "the absolute value of the percentage of the value (the difference) obtained by subtracting the diameter D3 of the inscribed circle from the diameter D2 of the inscribed circle, to the diameter D2 of the inscribed circle" will be referred to as "an internal maximum inscribed circle change ratio" sometimes. That is, the value (the absolute value) indicated by $|(1-(D3/D2)) \times 100|$ is "the internal maximum inscribed circle change ratio".

Further, in the specific open cell 2x, a portion in which "the maximum inscribed circle change ratio" and "the internal maximum inscribed circle change ratio" are both from 1 to 80% is the open changing portion 15 (see FIG. 4). The open changing portion 15 is present only in a range of the specific open cell 2x which is 20 mm or less from the first end face 11.

In the honeycomb structure of the present embodiment, the cells 2 having the open ends in a range of 1 to 80% of an area of the first end face 11 are the specific open cells 2x having the open changing portions 15 constituted as described above. According to such a constitution in the honeycomb structure 100 of the present embodiment shown in FIG. 1 to FIG. 5, it is possible to improve a purifying performance while remarkably effectively inhibiting increase of pressure loss. Furthermore, in the honeycomb structure of the present embodiment, its manufacturing is also comparatively simple and contributes to improvement of productivity. When at least one of "the maximum inscribed circle change ratio" and "the internal maximum inscribed circle change ratio" is smaller than 1%, it is not possible to obtain a sufficient improvement effect of the purifying performance. Furthermore, when at least one of the "the maximum inscribed circle change ratio" and "the internal maximum inscribed circle change ratio" is in excess of 80%, the increase of the pressure loss becomes excessively large. Furthermore, when the open changing portion of the specific open cell 2x is present in a range which is in excess of 20 mm from the first end face 11, the increase of the pressure loss becomes excessively large.

It is to be noted that in the honeycomb structure of the present embodiment, among the plurality of cells, the cells other than the specific open cells do not have the above-mentioned open changing portions. Further, the cells other than the specific open cells are non-specific open cells in which a size of an open end of each cell does not change or a change ratio in the open end is smaller than that in the open changing portion.

Here, for the specific open cells, in a case of defining a diameter of an inscribed circle which comes in contact with a peripheral edge of the cell in a range which is in excess of 20 mm from the first end face as a diameter D3X, the following constitution is preferable. In the specific open cell, it is preferable that the diameter D2 of the inscribed circle of this specific open cell and the diameter D3X of the inscribed circle of the specific open cell satisfy a relation of $|(1-(D3X/D2)) \times 100| < 1$. That is, in the diameter D3X of the inscribed circle which comes in contact with the peripheral edge of the cell in the range which is in excess of 20 mm from the first end face, it is preferable that "the internal maximum inscribed circle change ratio" is smaller than 1%. According to such a constitution, it is possible to remarkably effectively inhibit the increase of the pressure loss. Especially, the honeycomb structure is used so that the first end face is an inflow end face into which fluid such as an exhaust gas flows, whereby on an inflow end face side of the specific open cell, it is possible to cause turbulence in the flow of the fluid and improve contact efficiency between the fluid and each partition wall. When the turbulence can occur in the flow of the fluid once on the inflow end face side which is smaller than 20 mm from the first end face and even if the specific open cell on and after the side extends straight, the contact efficiency between the fluid and the partition wall in the range maintains a comparatively high state. On the other hand, when the specific open cell extends straight in the range which is in excess of 20 mm from the first end face, it is possible to dramatically inhibit the increase of the pressure loss which is caused by this specific open cell. Hereinafter, "an absolute value of a percentage of a value (a difference) obtained by subtracting the diameter D3X of the inscribed circle from the diameter D2 of the inscribed circle, to the diameter D2 of the inscribed circle" will be referred to as "the internal maximum inscribed circle change ratio in the range which is in excess of 20 mm from the first end face" sometimes.

Furthermore, it is more preferable that the specific open cell is constituted as follows in a case of defining, as a diameter D3Y, a diameter of an inscribed circle which comes in contact with a peripheral edge of a cell of a portion excluding the open changing portion 15 in a direction from the first end face toward the second end face. In the specific open cell, it is more preferable that the diameter D2 of the inscribed circle of this specific open cell and the diameter D3Y of the inscribed circle of the specific open cell satisfy a relation of $|(1-(D3Y/D2))\times100|<1$. "An absolute value of a percentage of a value (a difference) obtained by subtracting the diameter D3Y of the inscribed circle from the diameter D2 of the inscribed circle, to the diameter D2 of the inscribed circle" will be referred to as "the internal maximum inscribed circle change ratio in the portion other than the open changing portion" sometimes. For example, in this configuration, when the open changing portion is formed in the range which is up to 5 mm from the first end face, a range which is in excess of 5 mm up to the second end face satisfies the relation of the above-mentioned mathematical formula.

"The diameter D1 of the inscribed circle" and "the diameter D2 of the inscribed circle" of the specific open cell are measurable as follows. First, the first end face and the second end face of the honeycomb structure are imaged by an image measuring instrument. Further, the obtained images of the first end face and the second end face are image-analyzed, so that it is possible to obtain "the diameter D1 of the inscribed circle" and "the diameter D2 of the inscribed circle". As a method of the image analysis, for example, "VM-2520 (tradename)" manufactured by Nikon Corporation is usable.

"The diameter D3 of the inscribed circle" of the specific open cell is measurable as follows. The honeycomb structure is cut at intervals of 5 mm from the first end face and its cut surface is imaged by the image measuring instrument. Further, images of the imaged cut surface are successively image-analyzed, so that it is possible to obtain "the diameter D3 of the inscribed circle" which comes in contact with the peripheral edge of the cell in the range of 20 mm or less from the first end face. It is also possible to obtain "the diameter D3X of the inscribed circle" in the range which is in excess of 20 mm from the first end face by cutting the range of the honeycomb structure which is in excess of 20 mm from the first end face at the intervals of 5 mm as described above and performing image analysis of its cut surface. In this way, for example, it is possible to confirm that "the internal maximum inscribed circle change ratio in the range which is in excess of 20 mm from the first end face" is smaller than 1%.

It is to be noted that measurements of "the diameter D1 of the inscribed circle", "the diameter D2 of the inscribed circle" and "the diameter D3 of the inscribed circle" are performed on all the cells formed in the honeycomb structure body, and on the basis of the results of the performed measurements, it is judged whether or not each cell is the specific open cell. Furthermore, by measuring "the diameter D3X of the inscribed circle", it is possible to confirm that the open changing portion 15 is present only in the range of the specific open cell which is 20 mm or less from the first end face. On the basis of the results of the above-mentioned measurements, the cell having the open changing portion in which each of "the maximum inscribed circle change ratio" and "the internal maximum inscribed circle change ratio" is from 1 to 80% is defined as the specific open cell. Here, the cells other than the specific open cells are defined as the non-specific open cells. The non-specific open cells include cells in which at least one of "the maximum inscribed circle change ratio" and "the internal maximum inscribed circle change ratio" is not in the range of 1 to 80% and cells in which "the internal maximum inscribed circle change ratio in the range which is in excess of 20 mm from the first end face" is smaller than 1%. Among the non-specific open cells, cells constituted so that "the maximum inscribed circle change ratio" and "the internal maximum inscribed circle change ratio" are both smaller than 1% are referred to as normal cells sometimes. "The internal maximum inscribed circle change ratio" in the normal cells refers to all "the internal maximum inscribed circle change ratios" from the first end face to the second end face. In the honeycomb structure of the present embodiment, it is preferable that the non-specific open cells other than the specific open cells are the normal cells. For example, in the honeycomb structure 100 of the present embodiment shown in FIG. 1 to FIG. 4, in a case where the cells 2 having the open ends in the range of 1 to 80% of the area of the first end face 11 are the above-mentioned specific open cells 2x, the other cells are non-specific open cells 2y. Further, it is preferable that the non-specific open cells 2y are the above-mentioned "normal cells". Examples of the non-specific open cells other than the normal cells include cells in which one of "the maximum inscribed circle change ratio" and "the internal maximum inscribed circle change ratio" is 80% or less and the other one of "the maximum inscribed circle change ratio" and "the internal maximum inscribed circle change ratio" is smaller than 1%.

The specific open cells are present in a range of 1 to 80% of the area of the first end face of the honeycomb structure body. An area ratio of the range in which these specific open cells are present is referred to as "the area ratio of the specific open cells" sometimes. When the area ratio of the specific open cells is smaller than 1%, the improvement effect of the purifying performance might not sufficiently be obtained. When the area ratio of the specific open cells is in excess of 80%, the increase of the pressure loss becomes excessively large.

The area ratio of the specific open cells is from 1 to 80%, but preferably from 3 to 70%, more preferably from 4 to 65%, and especially preferably from 5 to 60%. The area ratio of the specific open cells is measurable as follows. First, the whole area of the first end face of the honeycomb structure body is measured. In this case, the area of the first end face of the honeycomb structure body includes an area of the circumferential wall disposed to surround the circumference of the honeycomb structure body. Next, on the basis of the measurement results of "the diameter D1 of the inscribed circle", "the diameter D2 of the inscribed circle" and "the diameter D3 of the inscribed circle" described above, the cells formed in the honeycomb formed body are classified into the specific open cells and the non-specific open cells. Next, an area of the cells classified as the specific open cells is measured. The area of the cells classified as the specific open cells is defined as an area calculated on the basis of a boundary of an intermediate value of a thickness of the partition walls disposed to surround the cells. A percentage of the total area of the cells classified as the specific open cells to the whole area of the first end face of the honeycomb structure body is calculated. The calculated value is the area ratio of the specific open cells.

Furthermore, during the calculation of the above-mentioned area ratio of the specific open cells, there is a case where a shape of the cells of the outermost circumference defined by the partition walls and the circumferential wall is not quadrangular. These cells are referred to as incomplete cells in the present specification. Also concerning these incomplete cells, diameters of respective inscribed circles are obtained and the cells are classified into specific open cells and non-specific open cells similarly to the above-mentioned method. Further, an area of each classified cell is measured and the area is for use in calculation of an area ratio of the specific open cells.

"A maximum inscribed circle change ratio" of the specific open cells is from 1 to 80%. "The maximum inscribed circle change ratio" is preferably from 3 to 70%, further preferably from 4 to 65%, and especially preferably from 5 to 60%.

Furthermore, "an internal maximum inscribed circle change ratio" in an open changing portion of the specific open cell is from 1 to 80%. "The internal maximum inscribed circle change ratio" in the open changing portion is preferably from 3 to 70%, further preferably from 4 to 65%, and especially preferably from 5 to 60%. According to such a constitution, it is possible to further improve the purifying performance while more effectively inhibiting the increase of the pressure loss.

The diameter D2 of the inscribed circle of each specific open cell is preferably from 0.5 to 2.2 mm, more preferably from 0.5 to 1.7 mm, further preferably from 0.6 to 1.55 mm, and especially preferably from 0.7 to 1.4 mm. When the diameter D2 of the inscribed circle of the specific open cell is from 0.5 to 2.2 mm, the honeycomb structure is excellent in purifying performance during use of the honeycomb structure as an exhaust gas purifying catalyst carrier or filter.

In the honeycomb structure of the present embodiment, the thickness of the partition walls is preferably from 40 to 350 μm, further preferably from 50 to 300 μm, and especially preferably from 55 to 250 μm. When the thickness of the partition walls is smaller than 40 μm, the partition walls might not be formed well because a die is clogged with a forming raw material when extruding the honeycomb structure. When the thickness of the partition walls is in excess of 350 μm, the pressure loss might increase, and output decrease of an engine or deterioration of fuel efficiency might be caused. The thickness of the partition walls is a value measured by a method of observing, with an optical microscope, a cross section of the honeycomb structure which is perpendicular to a cell extending direction.

In the honeycomb structure of the present embodiment, a cell density of the cells defined by the partition walls is preferably from 30 to 200 cells/cm$^2$ and further preferably from 45 to 140 cells/cm$^2$. According to such a constitution, the honeycomb structure of the present embodiment is suitably utilizable as the exhaust gas purifying catalyst carrier, filter or the like.

It is preferable that the partition walls and the circumferential wall include ceramic as a main component. A suitable example of a material of the partition walls and circumferential wall is a material including at least one selected from the group consisting of cordierite, silicon carbide, a silicon-silicon carbide based composite material, mullite, alumina, aluminum titanate, silicon nitride, a cordierite forming raw material, lithium aluminum silicate, aluminum titanate, and a silicon carbide-cordierite based composite material. When it is described that "the material includes ceramic as the main component", it is meant that the material contains ceramic as much as 50 mass % or more of the whole material.

In the honeycomb structure body, it is preferable that the partition walls defining the cells are integrally constituted. For example, as the honeycomb structure, there are two types of honeycomb structures, i.e., a so-called monolithic honeycomb structure in which all partition walls are integrally constituted and a honeycomb structure of a segmented structure in which a plurality of honeycomb structure bodies of the segmented structures are bonded. It is preferable that the honeycomb structure of the present embodiment is the so-called monolithic honeycomb structure mentioned earlier in these two types of honeycomb structures.

In the honeycomb structure of the present embodiment, a porosity of the partition walls is preferably from 20 to 70%, further preferably from 25 to 60%, and especially preferably from 25 to 50%. When the porosity of the partition walls is smaller than 20%, the pressure loss of the honeycomb structure increases, and the output decrease of the engine might be incurred in a case of using the honeycomb structure as a PM trapping filter to be disposed in an exhaust system of the engine. Furthermore, when the porosity of the partition walls is in excess of 70%, a sufficient strength might not be obtained. The porosity of the partition walls is a value measured by mercury porosimetry.

A shape of the cells defined by the partition walls is quadrangular or triangular. In the honeycomb structure of the present embodiment, a shape of the open ends of the specific open cells vary in the first end face and the second end face. It is preferable that in the second end face, the shape of the open ends of the specific open cells and a shape of the open ends of the non-specific open cells are the same shape.

There is not any special restriction on a shape of the honeycomb structure, but examples of the shape include a round pillar shape, a pillar shape in which each end face is elliptic, a pillar shape in which each end face is oblong, and a prismatic columnar shape in which each end face has a polygonal shape such as a quadrangular shape, a pentangular shape, or a hexagonal shape. In a case where the shape of each end face of the honeycomb structure is quadrangular, examples of the shape include a square, a rectangular shape and a trapezoidal shape. Furthermore, the shape of the end face of the honeycomb structure may be such a shape that each corner of a polygonal shape such as a quadrangular shape, a pentangular shape or a hexagonal shape is rounded. In the honeycomb structure, the circumferential wall is disposed to surround the circumference of the honeycomb structure body, and hence a circumferential shape of the honeycomb structure is a side face shape of the circumferential wall.

There is not any special restriction on a size of the honeycomb structure. It is preferable that a length of the honeycomb structure in the cell extending direction is from 35 to 440 mm. According to such a constitution, it is possible to achieve an excellent purifying performance by the honeycomb structure without increasing the pressure loss.

In the honeycomb structure of the present embodiment, a catalyst, e.g., an oxidation catalyst may be loaded onto at least parts of the partition walls. In more detail, it is preferable that the catalyst is loaded onto the partition walls constituting the honeycomb structure. An amount of the catalyst to be loaded per unit volume of the honeycomb structure is preferably from 15 to 350 g/liter, further preferably from 30 to 300 g/liter, and especially preferably from 50 to 250 g/liter. When the amount is smaller than 15 g/liter, a catalytic effect is hard to be exerted. When the amount is larger than 350 g/liter, pores of the partition walls are closed, the pressure loss therefore increases, and trapping efficiency might remarkably deteriorate.

In a case of loading the catalyst onto the honeycomb structure of the present embodiment, it is preferable that the catalyst includes at least one selected from the group consisting of a three-way catalyst, an SCR catalyst, an $NO_x$ absorber catalyst, and an oxidation catalyst. The three-way catalyst is a catalyst to mainly purify hydrocarbons (HC), carbon monoxide (CO), and nitrogen oxides ($NO_x$). An example of the three-way catalyst is a catalyst including platinum (Pt), palladium (Pd), and rhodium (Rh). The SCR catalyst is a catalyst to selectively reduce a component to be purified. Especially, in a honeycomb catalyst body of the present embodiment, it is preferable that the SCR catalyst is an $NO_x$ selectively reducing SCR catalyst which selectively reduces $NO_x$ in the exhaust gas. A suitable example of the $NO_x$ selectively reducing SCR catalyst is a catalyst which selectively reduces and purifies $NO_x$ in the exhaust gas. Furthermore, an example of the SCR catalyst is a metal-substituted zeolite. Examples of a metal for the metal-substituted zeolite include iron (Fe) and copper (Cu). A suitable example of the zeolite is a beta zeolite. Furthermore, the SCR catalyst may be a catalyst containing, as a main component, at least one selected from the group consisting of vanadium and titania. Examples of the $NO_x$ absorber catalyst include an alkali metal and/or an alkali earth metal. Examples of the alkali metal include potassium, sodium, and lithium. An example of the alkali earth metal is calcium. An example of the oxidation catalyst is a catalyst containing a noble metal. Specifically, it is preferable that the oxidation catalyst contains at least one selected from the group consisting of platinum, palladium and rhodium.

In a case of using the honeycomb structure of the present embodiment as the PM trapping filter, the honeycomb structure may further include plugging portions which plug the open ends of the cells. The plugging portions can be disposed in, for example, the open ends of the predetermined cells on the first end face side and the open ends of the residual cells other than the predetermined cells on the second end face side. A material of the plugging portions may be the same as or different from a material of the partition walls and circumferential wall of the honeycomb structure body.

In a case where the honeycomb structure of the present embodiment further includes the plugging portions, a suitable example of the honeycomb structure is the honeycomb structure constituted in this manner. The suitable example of the honeycomb structure is a honeycomb structure where the predetermined cells including the plugging portions on the first end face side and the residual cells including the plugging portions on the second end face side are arranged in zigzag.

In a case of using the honeycomb structure of the present embodiment as the catalyst carrier or the PM trapping filter, the inflow end face into which the gas flows may be the first end face of the honeycomb structure or the second end face of the honeycomb structure. For example, when the first end face of the honeycomb structure is the inflow end face into which the gas flows and the second end face of the honeycomb structure is an outflow end face from which the gas flows, the turbulence is easy to occur in the flow of the gas in the inflow end face.

Figure 8A:
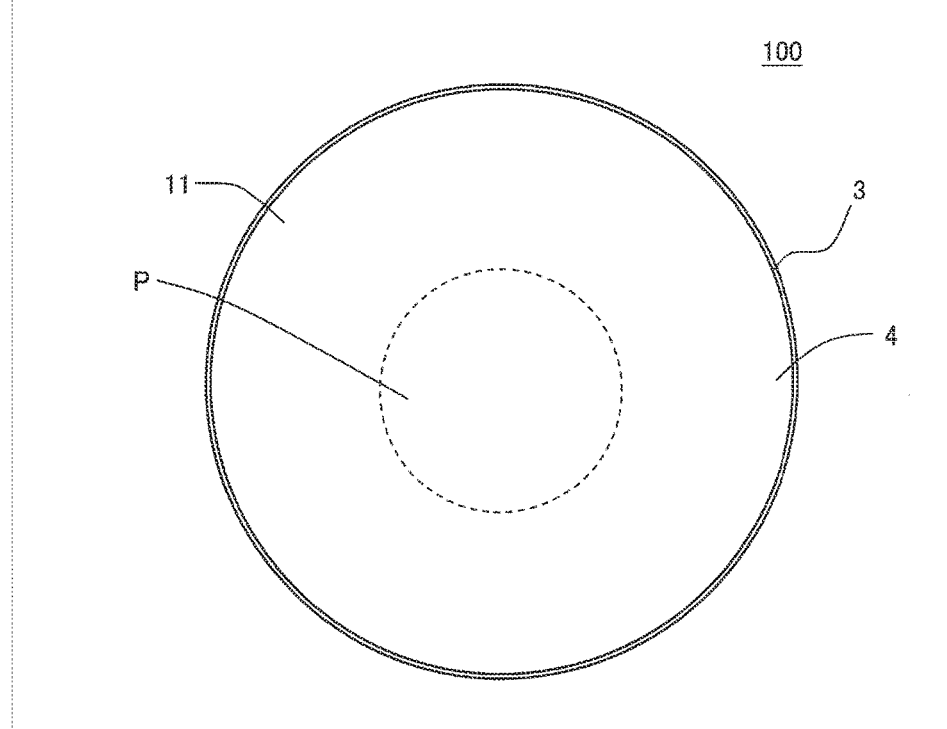
FIG. 8A is a schematic view schematically showing one example of a range in which specific open cells are formed and a plan view of the honeycomb structure seen from the first end face side.
Figure 8B:
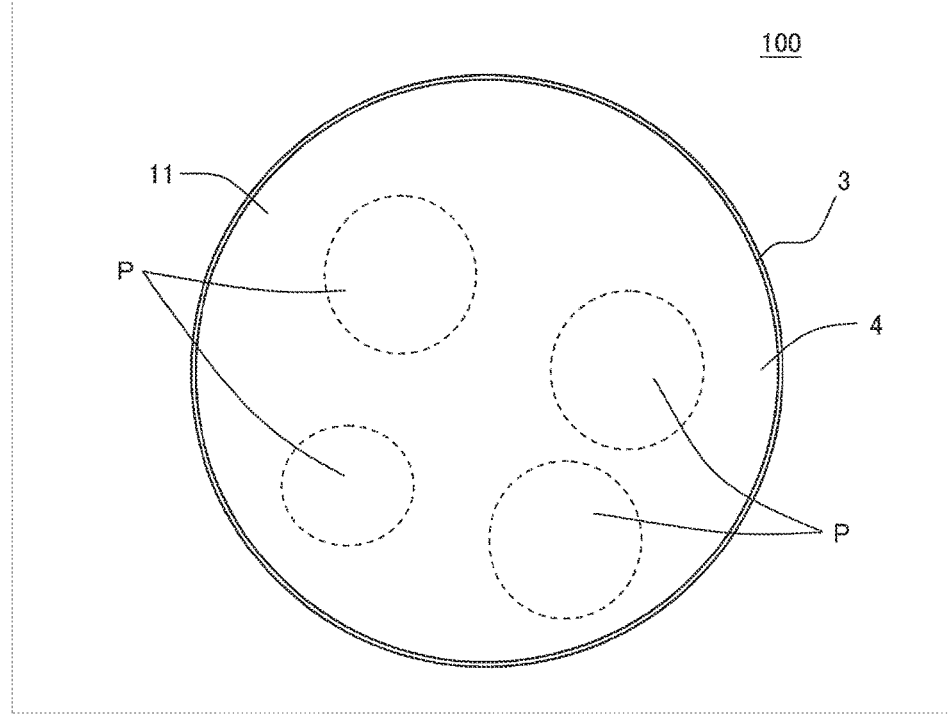
FIG. 8B is a schematic view schematically showing another example of the range in which the specific open cells are formed and a plan view of the honeycomb structure seen from the first end face side.
Figure 8C:
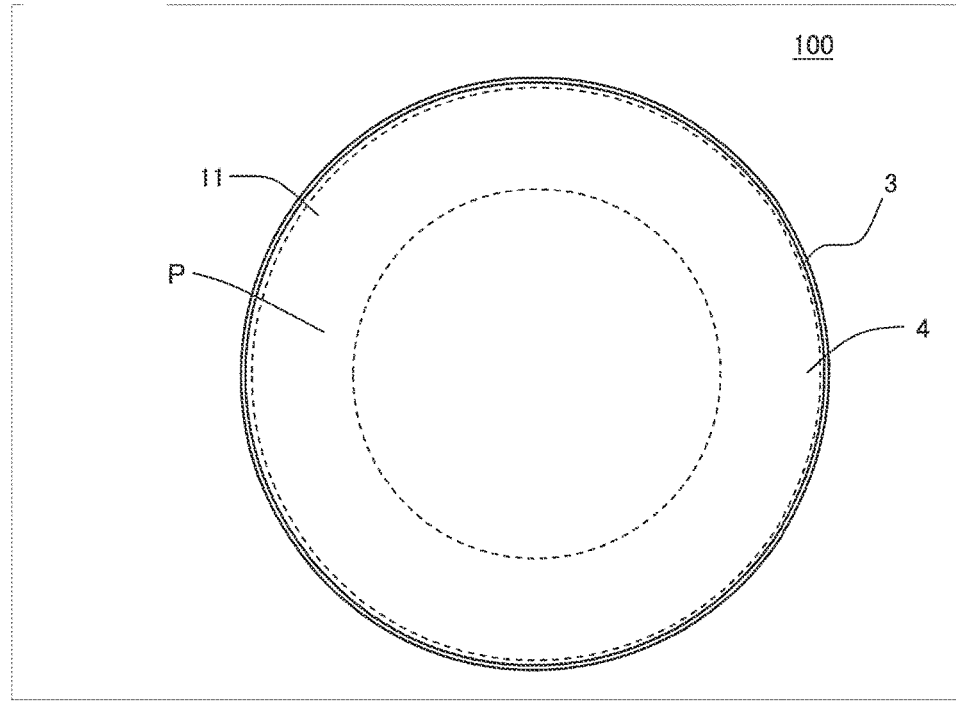
FIG. 8C is a schematic view schematically showing still another example of the range in which the specific open cells are formed and a plan view of the honeycomb structure seen from the first end face side.
Figure 8D:
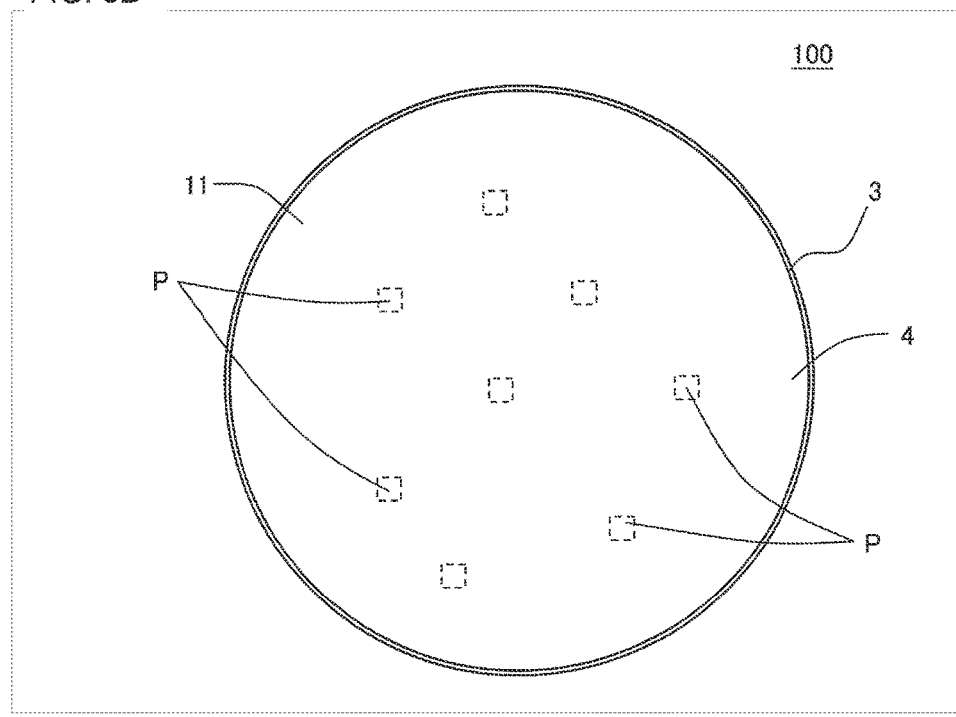
FIG. 8D is a schematic view schematically showing a further example of the range in which the specific open cells are formed and a plan view of the honeycomb structure seen from the first end face side.
Figure 8E:
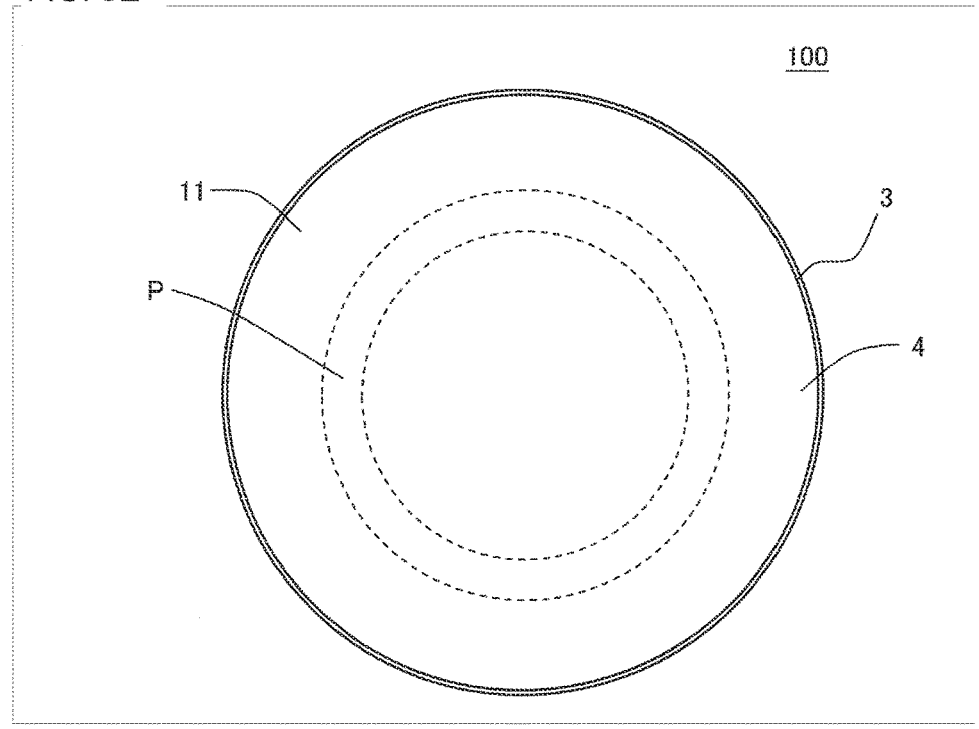
FIG. 8E is a schematic view schematically showing a still further example of the range in which the specific open cells are formed and a plan view of the honeycomb structure seen from the first end face side.

Here, there will specifically be described a range in which the specific open cells are formed, i.e., a presence range of the specific open cells on the first end face in the honeycomb structure of the present embodiment with reference to FIG. 8A to FIG. 8E. FIG. 8A is a schematic view schematically showing one example of the range in which the specific open cells are formed and a plan view of the honeycomb structure seen from the first end face side. FIG. 8B is a schematic view schematically showing another example of the range in which the specific open cells are formed and a plan view of the honeycomb structure seen from the first end face side. Each of FIG. 8C to FIG. 8E is a schematic view schematically showing still another example of the range in which the specific open cells are formed and a plan view of the honeycomb structure seen from the first end face side. In FIG. 8A to FIG. 8E, drawings are prepared in the form of eliminating the partition walls and the cells on the first end face. In FIG. 8A to FIG. 8E, reference numeral 3 indicates the circumferential wall and reference numeral 4 indicates the honeycomb structure body.

As shown in FIG. 8A, a range P in which the specific open cells are formed may concentrate on one region of the first end face 11. In FIG. 8A, the range P in which the specific open cells are formed on the first end face 11 concentrates on one region of a central portion of the first end face 11 of the honeycomb structure 100. It is to be noted that in a case where the range P in which the specific open cells are formed concentrates on one region, the region does not have to be the central portion of the first end face 11. For example, the region may shift to a circumferential portion of the first end face 11.

As shown in FIG. 8B, the range P in which the specific open cells are formed on the first end face 11 may include a plurality of regions of the first end face 11 of the honeycomb structure 100. In a case where there are a plurality of ranges P in which the specific open cells are formed on the first end face 11, a size of each range may be the same or different. Furthermore, in the case that there are the plurality of ranges P in which the specific open cells are formed on the first end face 11, a shape of each range may be the same or different. For example, each range P may have an irregular shape or, for example, a regular shape in which the number of the specific open cells in each column and the number of the specific open cells in each row are adjusted. Furthermore, the respective ranges P may irregularly be dotted or may be arranged at equal intervals.

As shown in FIG. 8C, the range P in which the specific open cells are formed on the first end face 11 may annularly be present in the circumferential portion of the first end face 11 of the honeycomb structure 100. In FIG. 8C, the range P in which the specific open cells are formed on the first end face 11 concentrates on the circumferential portion of the first end face 11 of the honeycomb structure 100, and the non-specific open cells are present in the central portion of the first end face 11.

As shown in FIG. 8D, the ranges P in which the specific open cells are formed on the first end face 11 may be dotted in a plurality of regions of the first end face 11 of the honeycomb structure 100. A configuration shown in FIG. 8D is different from the configuration shown in FIG. 8B in that in FIG. 8D, the range P in which the specific open cells are to be formed is constituted of one specific open cell. It is to be noted that such a range P constituted of the one specific open cell as shown in FIG. 8D may be present in a part of the configuration shown in FIG. 8B.

As shown in FIG. 8E, the range P in which the specific open cells are formed on the first end face 11 may be annularly present between the center and the circumference in the first end face 11 of the honeycomb structure 100. In FIG. 8E, the non-specific open cells are present in the central portion and circumferential portion of the first end face 11.

Figure 9A:
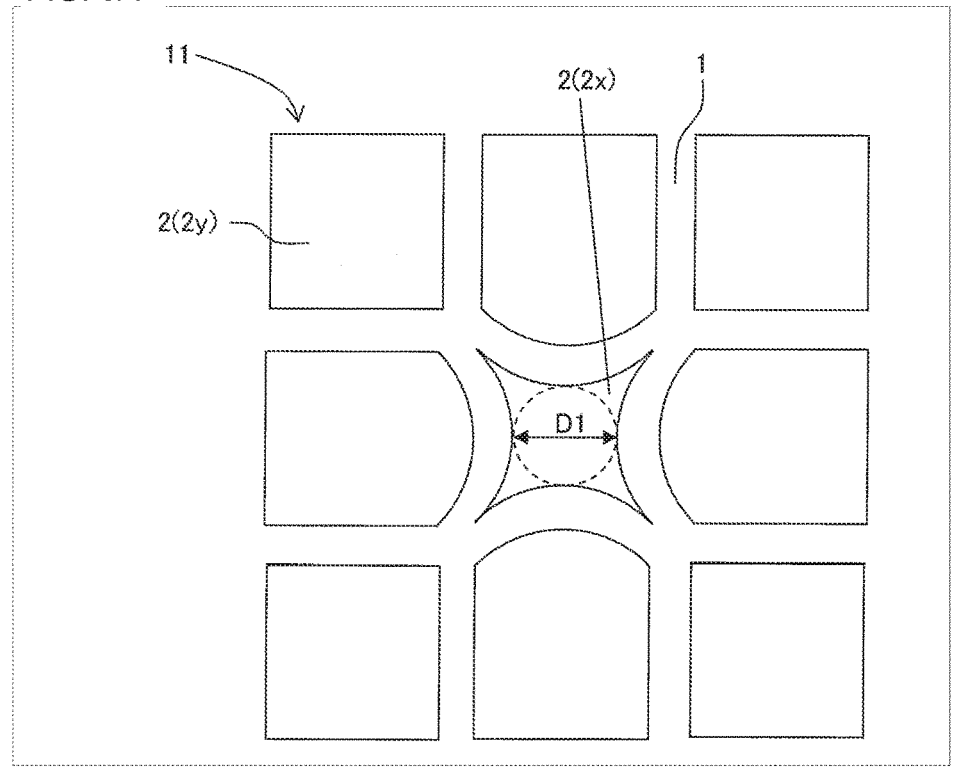
FIG. 9A is a schematic view schematically showing one example of the specific open cell and a plan view of the specific open cell seen from the first end face side.
Figure 9B:
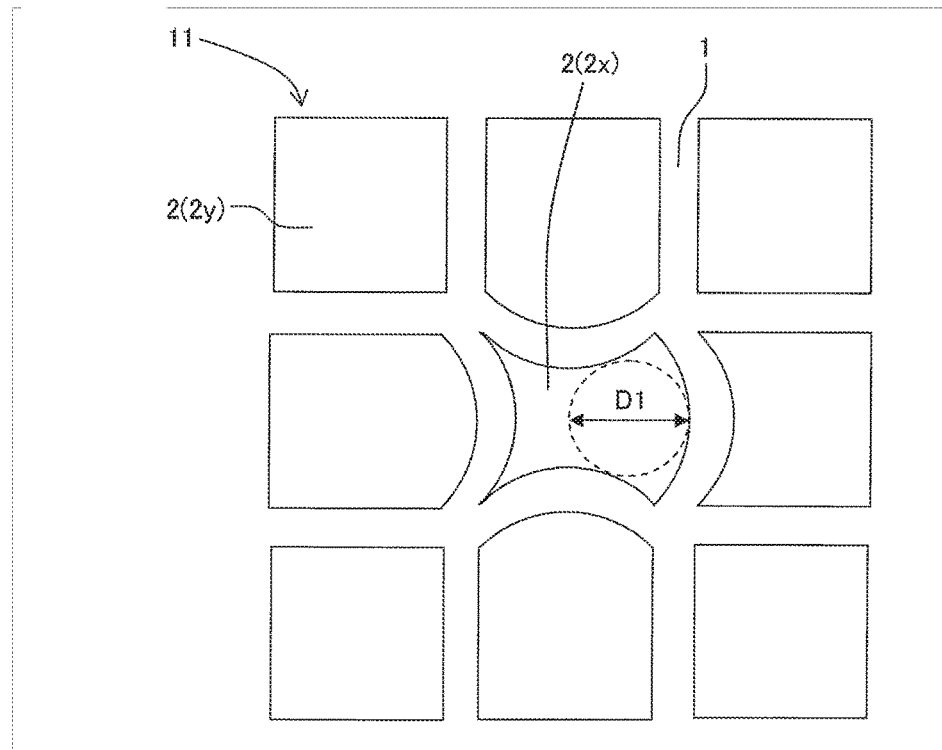
FIG. 9B is a schematic view schematically showing another example of the specific open cell and a plan view of the specific open cell seen from the first end face side.
Figure 9C:
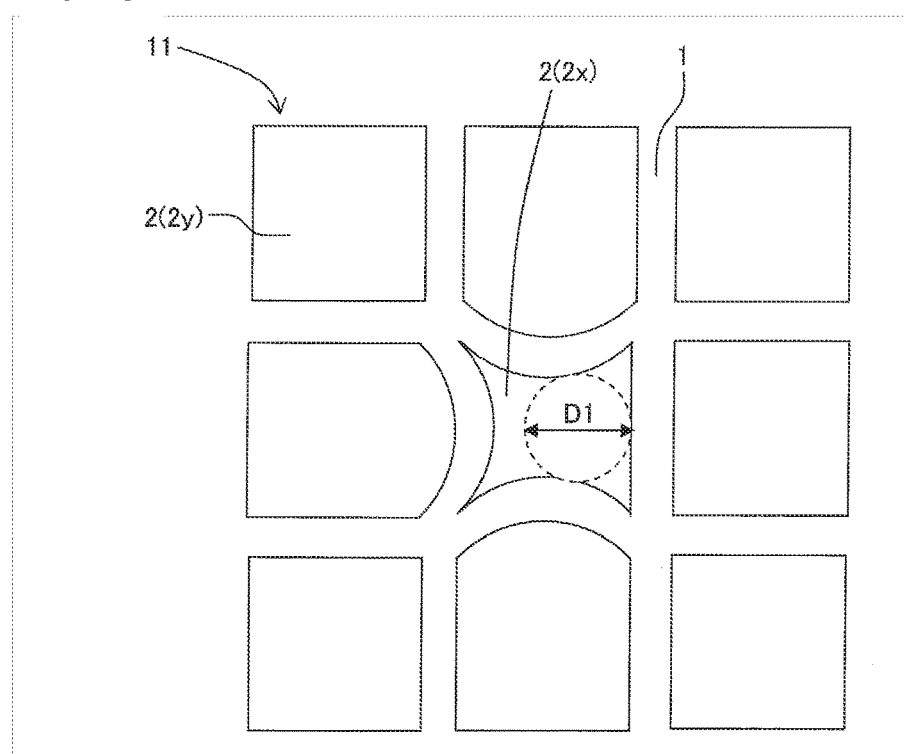
FIG. 9C is a schematic view schematically showing still another example of the specific open cell and a plan view of the specific open cell seen from the first end face side.
Figure 9D:
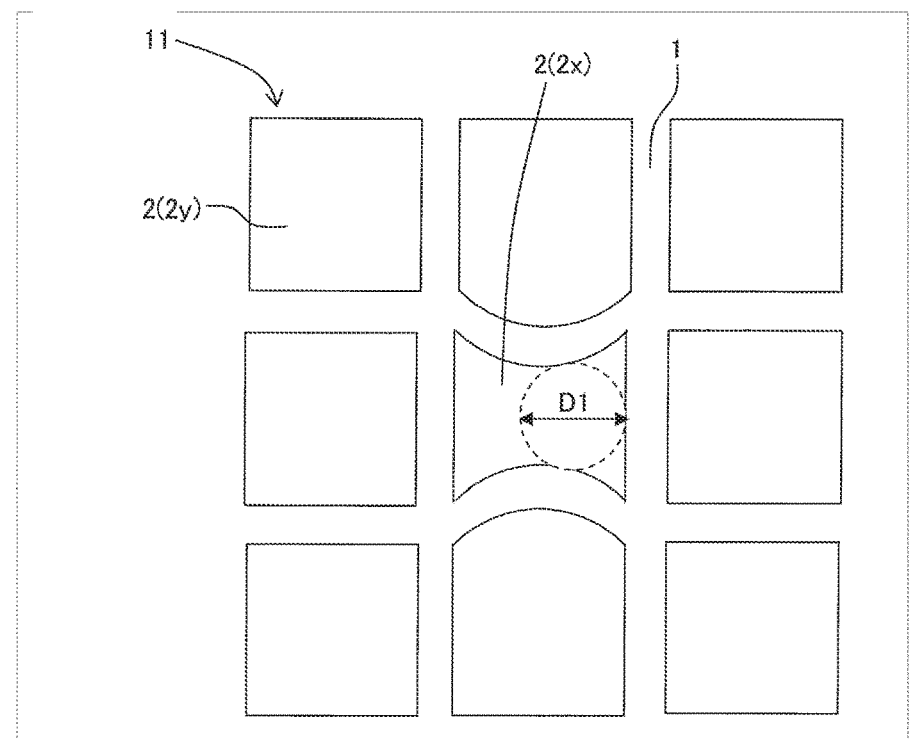
FIG. 9D is a schematic view schematically showing still another example of the specific open cell and a plan view of the specific open cell seen from the first end face side.
Figure 9E:
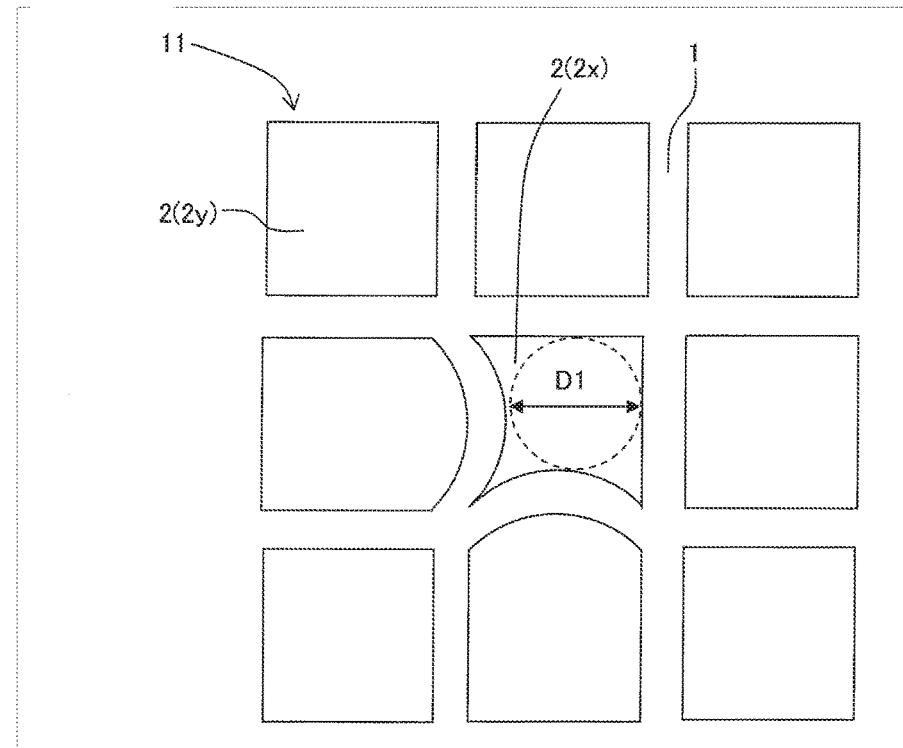
FIG. 9E is a schematic view schematically showing a further example of the specific open cell and a plan view of the specific open cell seen from the first end face side.
Figure 9F:
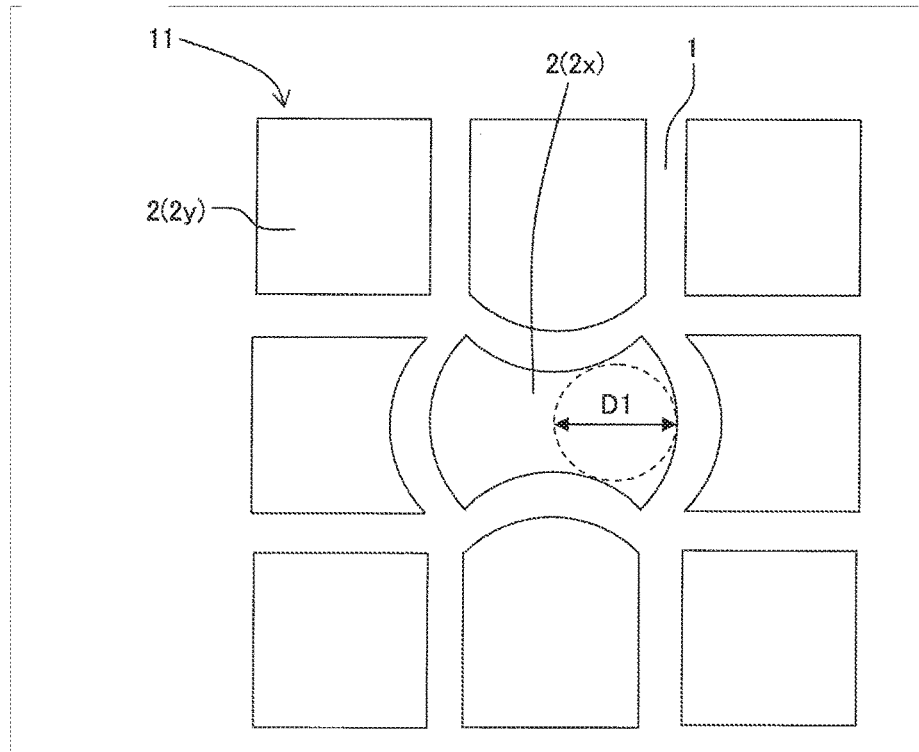
FIG. 9F is a schematic view schematically showing a further example of the specific open cell and a plan view of the specific open cell seen from the first end face side.
Figure 9G:
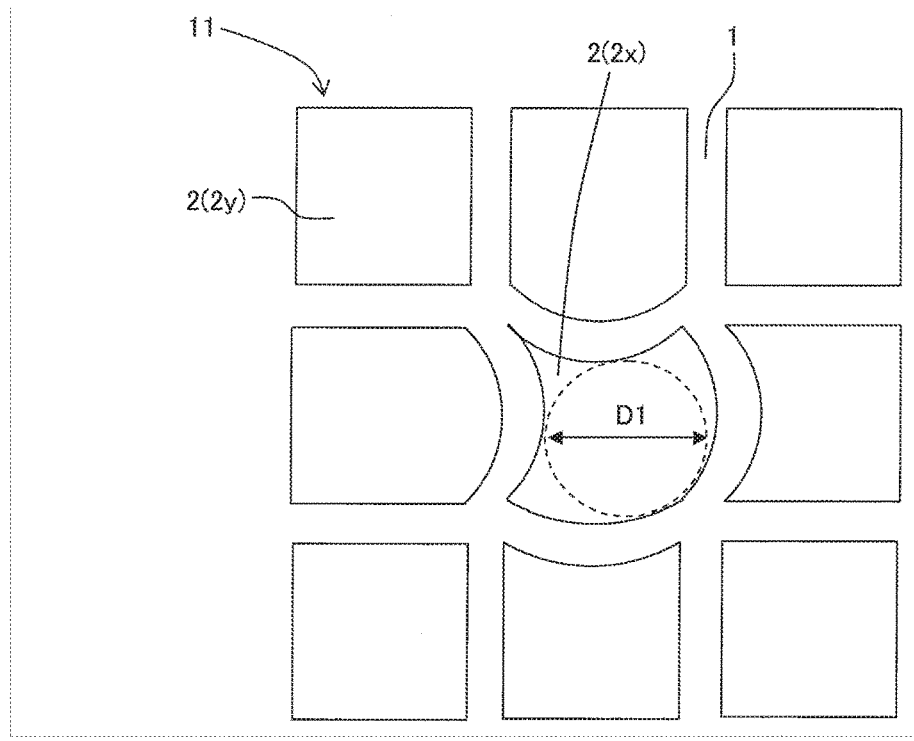
FIG. 9G is a schematic view schematically showing a further example of the specific open cell and a plan view of the specific open cell seen from the first end face side.
Figure 9H:
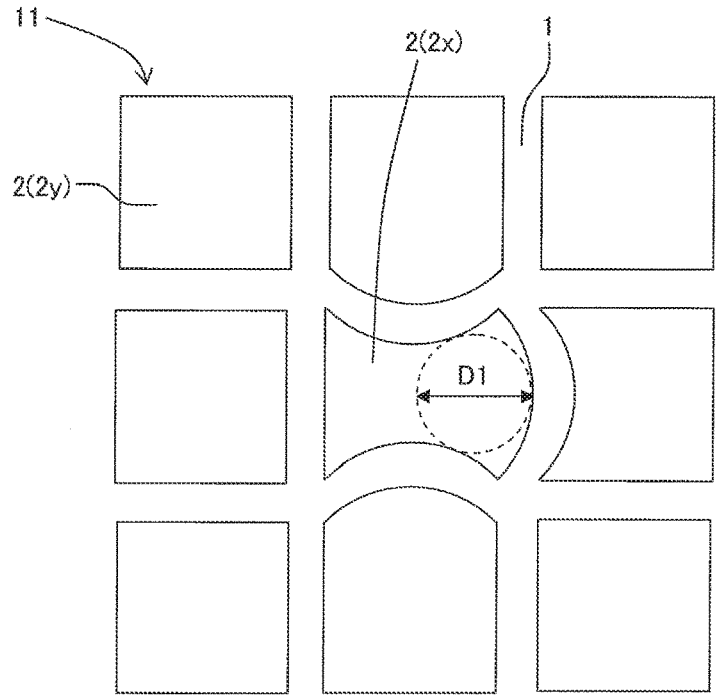
FIG. 9H is a schematic view schematically showing a further example of the specific open cell and a plan view of the specific open cell seen from the first end face side.
Figure 9I:
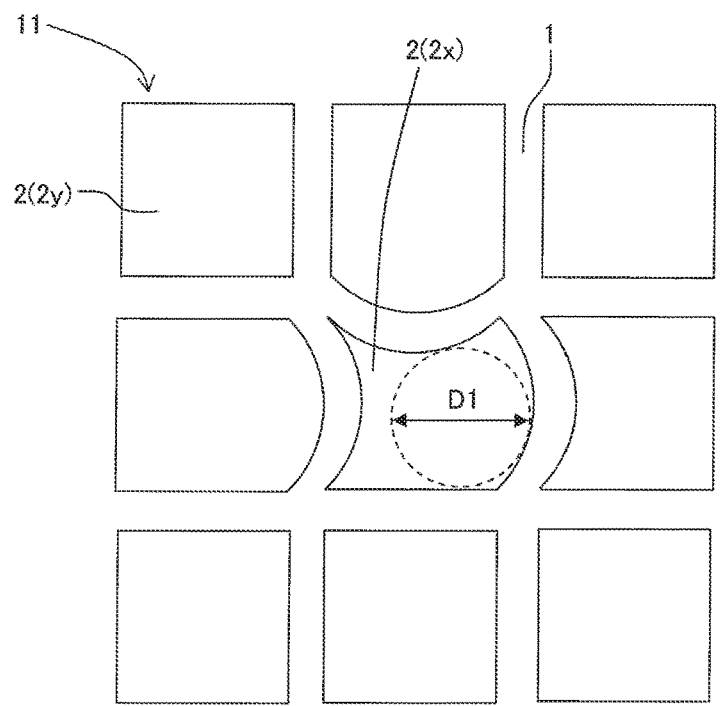
FIG. 9I is a schematic view schematically showing a further example of the specific open cell and a plan view of the specific open cell seen from the first end face side.
Figure 9J:
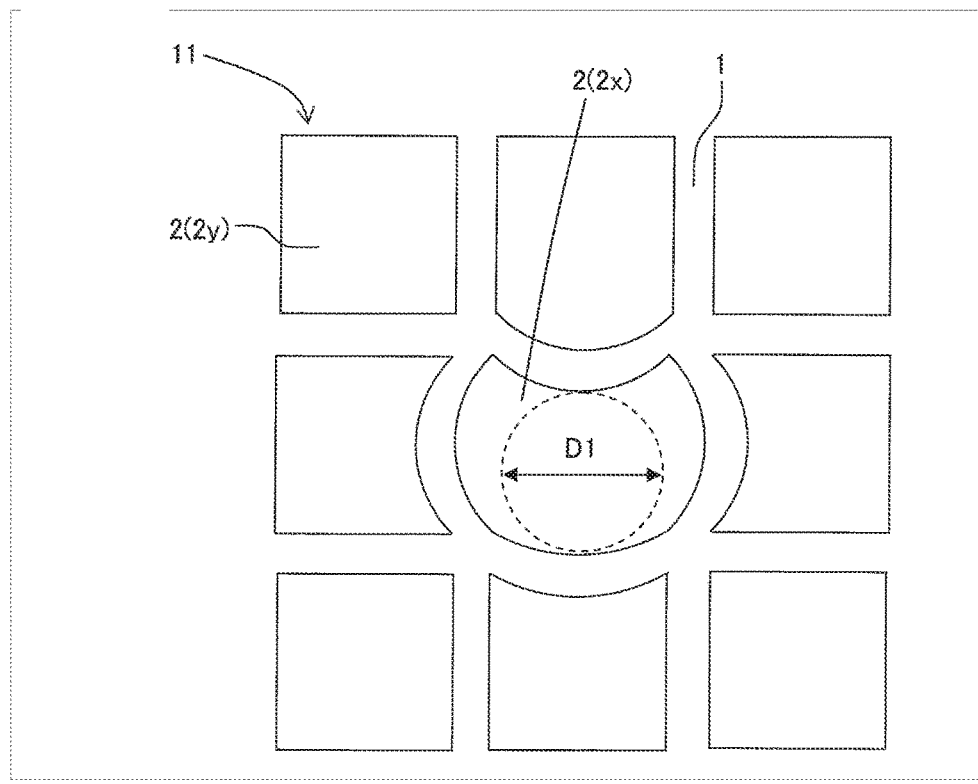
FIG. 9J is a schematic view schematically showing a further example of the specific open cell and a plan view of the specific open cell seen from the first end face side.
Figure 9K:
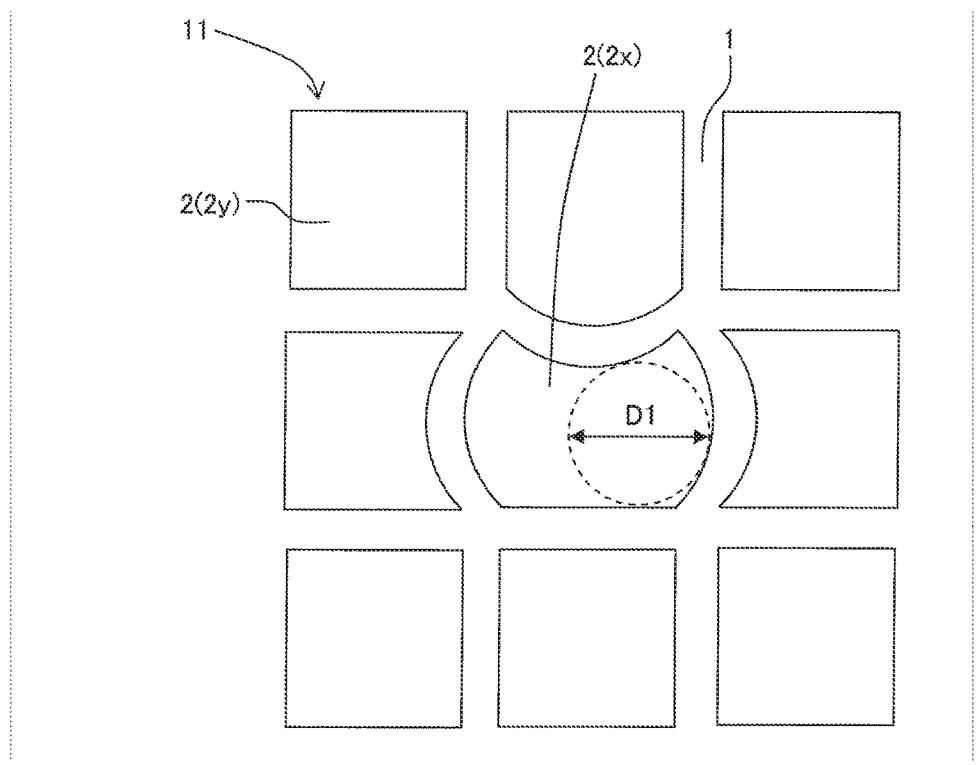
FIG. 9K is a schematic view schematically showing a further example of the specific open cell and a plan view of the specific open cell seen from the first end face side.
Figure 9L:
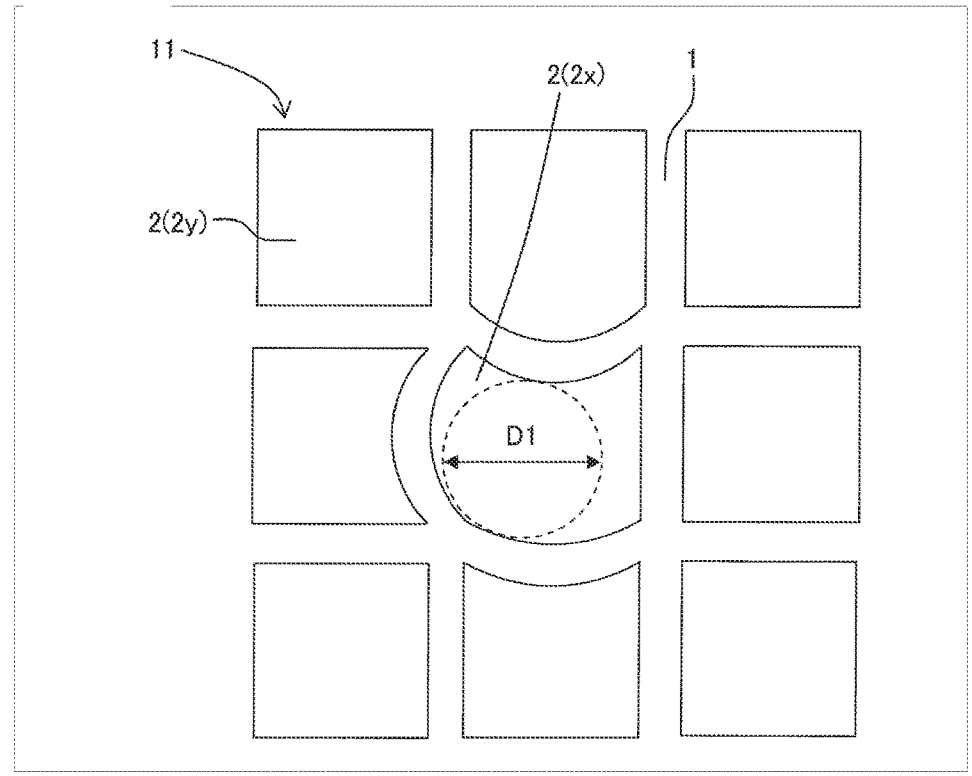
FIG. 9L is a schematic view schematically showing a further example of the specific open cell and a plan view of the specific open cell seen from the first end face side.
Figure 9M:
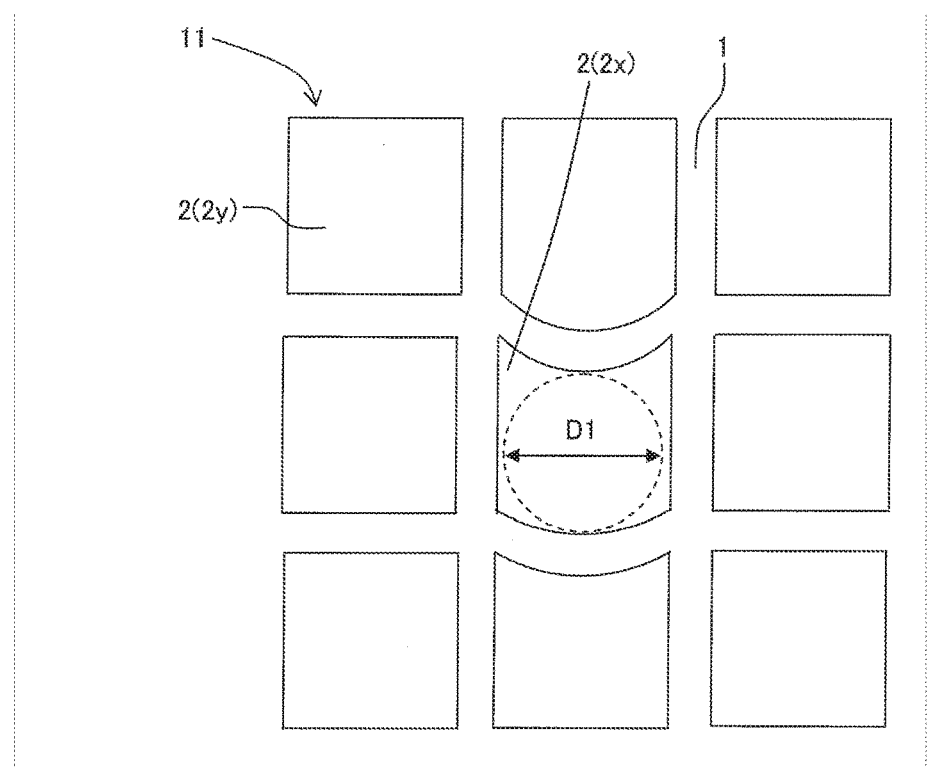
FIG. 9M is a schematic view schematically showing a further example of the specific open cell and a plan view of the specific open cell seen from the first end face side.
Figure 9N:
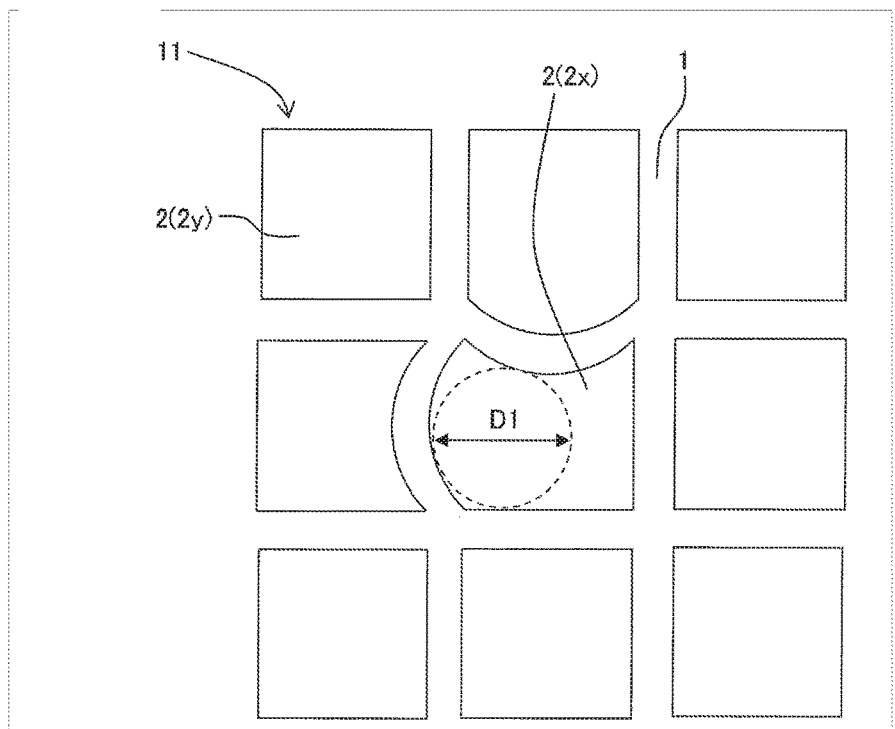
FIG. 9N is a schematic view schematically showing a further example of the specific open cell and a plan view of the specific open cell seen from the first end face side.
Figure 9O:
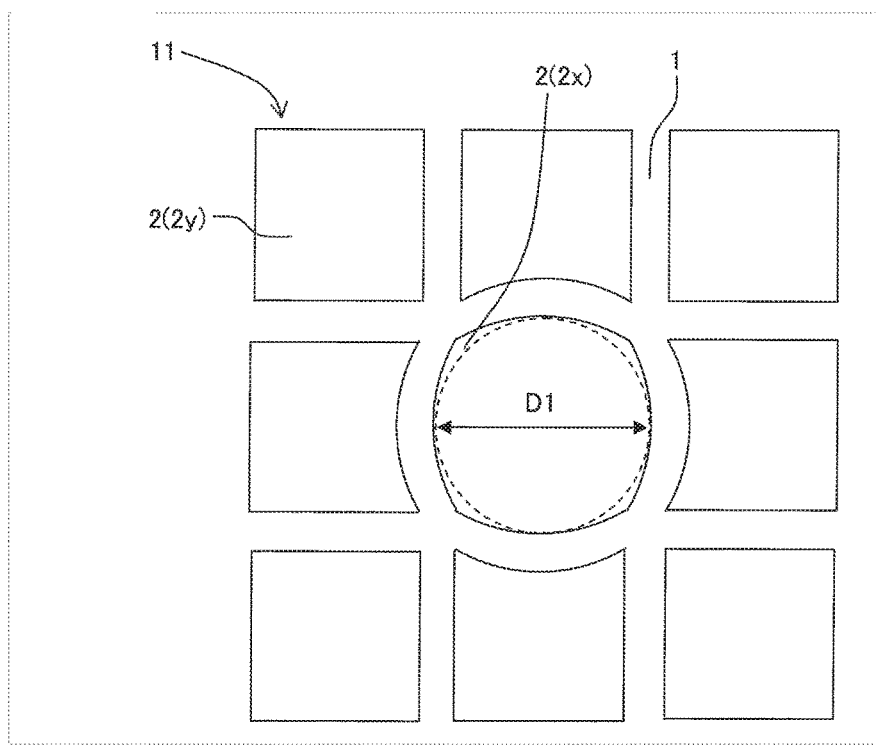
FIG. 9O is a schematic view schematically showing a still further example of the specific open cell and a plan view of the specific open cell seen from the first end face side.

Next, there will specifically be described a shape of the open ends of the specific open cells in the first end face of the honeycomb structure of the present embodiment with reference to FIG. 9A to FIG. 9O. Here, in the specific open cells 2x shown in FIG. 9A to FIG. 9O, a shape of the open end in the unshown second end face is defined as a square. Further, respective "sides" constituting the shape of the open end of the specific open cell 2x shown in each of FIG. 9A to FIG. 9O correspond to four sides constituting the square of the open end in the unshown second end face. Furthermore, in FIG. 9A to FIG. 9O, for the diameter D1 of the inscribed circle of the specific open cell 2x, "the maximum inscribed circle change ratio" is included in a range of 1 to 80%. Here, FIG. 9A is a schematic view schematically showing one example of the specific open cell and a plan view of the specific open cell seen from the first end face side. FIG. 9B is a schematic view schematically showing another example of the specific open cell and a plan view of the specific open cell seen from the first end face side. Each of FIG. 9C to FIG. 9O is a schematic view schematically showing still another example of the specific open cell and a plan view of the specific open cell seen from the first end face side.

As shown in FIG. 9A, in the first end face 11, the specific open cell 2x has a shape in which four "sides" curve toward the inside of the specific open cell 2x. FIG. 9A shows an example where each "side" of the specific open cell 2x curves into an arc shape, but the shape is not limited to the arc shape, and the sides may be deformed into another intermediate shape.

As shown in FIG. 9B, in the first end face 11, the specific open cell 2x has a shape in which three "sides" curve toward the inside of the specific open cell 2x and the remaining one "side" curves toward the outside of the specific open cell 2x. FIG. 9B shows an example where the respective "sides" of the specific open cell 2x curve into an arc shape, but the shape is not limited to the arc shape, and the sides may be deformed into another intermediate shape.

As shown in FIG. 9C, in the first end face 11, three "sides" of the specific open cell 2x curve toward the inside of the specific open cell 2x, and the remaining one "side" is straight as it is without being deformed from the side of the open end in the second end face. FIG. 9C shows an example where the three "sides" of the specific open cell 2x curve into an arc shape, but the shape is not limited to the arc shape, and the sides may be deformed into another intermediate shape.

As shown in FIG. 9D, in the first end face 11, two "sides" of the specific open cell 2x curve toward the inside of the specific open cell 2x, and the remaining two "sides" are straight as they are without being deformed from the sides of the open end in the second end face. The two "sides" curving inward are sides facing each other. Hereinafter, these two "sides" will be referred to as the two "sides" facing each other sometimes. FIG. 9D shows an example where the two "sides" of the specific open cell 2x curve into an arc shape, but the shape is not limited to the arc shape, and the sides may be deformed into another intermediate shape.

As shown in FIG. 9E, in the first end face 11, two "sides" of the specific open cell 2x curve toward the inside of the specific open cell 2x, and the remaining two "sides" are straight as they are without being deformed from the sides of the open end in the second end face. The two inwardly curving "sides" come in contact at one end thereof and these two "sides" constitute one corner. Hereinafter, these two "sides" will be referred to as two adjacent "sides" sometimes. FIG. 9E shows an example where the two "sides" of the specific open cell 2x curve into an arc shape, but the shape is not limited to the arc shape, and the sides may be deformed into another intermediate shape.

As shown in FIG. 9F, in the first end face 11, the specific open cell 2x has a shape in which two "sides" facing each other curve toward the inside of the specific open cell 2x, and the remaining two "sides" curve toward the outside of the specific open cell 2x. FIG. 9F shows an example where the respective "sides" of the specific open cell 2x curve into an arc shape, but the shape is not limited to the arc shape, and the sides may be deformed into another intermediate shape.

As shown in FIG. 9G, in the first end face 11, the specific open cell 2x has a shape in which two adjacent "sides" curve toward the inside of the specific open cell 2x, and the remaining two adjacent "sides" curve toward the outside of the specific open cell 2x. FIG. 9G shows an example where the four "sides" of the specific open cell 2x curve into an arc shape, but the shape is not limited to the arc shape, and the sides may be deformed into another intermediate shape.

As shown in FIG. 9H, in the first end face 11, the specific open cell 2x has a shape in which two "sides" facing each other curve toward the inside of the specific open cell 2x, and one "side" curves toward the outside of the specific open cell 2x. Further, the remaining one "side" is straight as it is without being deformed from the side of the open end in the second end face. FIG. 9H shows an example where the three "sides" of the specific open cell 2x curve into an arc shape, but the shape is not limited to the arc shape, and the sides may be deformed into another intermediate shape.

As shown in FIG. 9I, in the first end face 11, the specific open cell 2x has a shape in which two adjacent "sides" curve toward the inside of the specific open cell 2x, and one "side" curves toward the outside of the specific open cell 2x. Further, the remaining one "side" is straight as it is without being deformed from the side of the open end in the second end face. FIG. 9I shows an example where the three "sides" of the specific open cell 2x curve into an arc shape, but the shape is not limited to the arc shape, and the sides may be deformed into another intermediate shape.

As shown in FIG. 9J, in the first end face 11, the specific open cell 2x has a shape in which one "side" curves toward the inside of the specific open cell 2x, and the remaining three "sides" curve toward the outside of the specific open cell 2x. FIG. 9J shows an example where the four "sides" of the specific open cell 2x curve into an arc shape, but the shape is not limited to the arc shape, and the sides may be deformed into another intermediate shape.

As shown in FIG. 9K, in the first end face 11, the specific open cell 2x has a shape in which one "side" curves toward the inside of the specific open cell 2x, and two "sides" facing each other curve toward the outside of the specific open cell 2x. Further, the remaining one "side" is straight as it is without being deformed from the side of the open end in the second end face. FIG. 9K shows an example where the three "sides" of the specific open cell 2x curve into an arc shape, but the shape is not limited to the arc shape, and the sides may be deformed into another intermediate shape.

As shown in FIG. 9L, in the first end face 11, the specific open cell 2x has a shape in which one "side" curves toward the inside of the specific open cell 2x, and two adjacent "sides" curve toward the outside of the specific open cell 2x. Further, the remaining one "side" is straight as it is without being deformed from the side of the open end in the second end face. FIG. 9K shows an example where the three "sides" of the specific open cell 2x curve into an arc shape, but the shape is not limited to the arc shape, and the sides may be deformed into another intermediate shape.

As shown in FIG. 9M, in the first end face 11, the specific open cell 2x has a shape in which one "side" curves toward the inside of the specific open cell 2x, and one "side" facing the inwardly curving "side" curves toward the outside of the specific open cell 2x. Further, the remaining two facing "sides" are straight as they are without being deformed from the sides of the open end in the second end face. FIG. 9M shows an example where the two "sides" of the specific open cell 2x curve into an arc shape, but the shape is not limited to the arc shape, and the sides may be deformed into another intermediate shape.

As shown in FIG. 9N, in the first end face 11, the specific open cell 2x has a shape in which one "side" curves toward the inside of the specific open cell 2x, and one "side" adjacent to the inwardly curving "side" curves toward the outside of the specific open cell 2x. Further, the remaining two "sides" are straight as they are without being deformed from the sides of the open end in the second end face. FIG. 9N shows an example where the two "sides" of the specific open cell 2x curve into an arc shape, but the shape is not limited to the arc shape, and the sides may be deformed into another intermediate shape.

As shown in FIG. 9O, in the first end face 11, the specific open cell 2x has a shape in which four "sides" curve toward the outside of the specific open cell 2x. FIG. 9O shows an example where the four "sides" of the specific open cell 2x curve into an arc shape, but the shape is not limited to the arc shape, and the sides may be deformed into another intermediate shape.

(2) Manufacturing Method of Honeycomb Structure:

Next, a method of manufacturing the honeycomb structure of the present invention will be described. An example of the manufacturing method of the honeycomb structure of the present invention is a method including a step of preparing a honeycomb formed body and a step of drying and firing the honeycomb formed body. Furthermore, as required, the method may further have a step of deforming a cell shape of the honeycomb formed body or a honeycomb dried body which is the dried honeycomb formed body. Hereinafter, the step of preparing the honeycomb formed body will be described as a forming step. The step of drying and firing the honeycomb formed body will be described as a firing step. Furthermore, the step of deforming the cell shape will be described as a cell deforming step.

(2-1) Forming Step:

The forming step is a step of extruding, in the form of a honeycomb, a kneaded material obtained by kneading a forming raw material, to obtain the honeycomb formed body. The honeycomb formed body has partition walls which define cells extending from a first end face to a second end face, and a circumferential wall which is formed to surround an outermost circumference of the partition walls. A honeycomb structure portion constituted of the partition walls becomes the honeycomb structure body. In the forming step, first, the forming raw material is kneaded to obtain the kneaded material. Next, the obtained kneaded material is extruded to obtain the honeycomb formed body in which the partition walls and the circumferential wall are integrally formed.

It is preferable that the forming raw material is prepared by adding a dispersing medium and an additive to a ceramic raw material. Examples of the additive include an organic binder, a pore former, and a surfactant. An example of the dispersing medium is water.

It is preferable that the ceramic raw material is at least one selected from the group consisting of cordierite, silicon carbide, a silicon-silicon carbide based composite material, mullite, alumina, aluminum titanate, silicon nitride, a cordierite forming raw material, lithium aluminum silicate, aluminum titanate, and a silicon carbide-cordierite based composite material. Among these materials, the cordierite forming raw material is preferable which only has a small thermal expansion coefficient and is excellent in thermal shock resistance.

Examples of the organic binder include methylcellulose, hydroxypropoxyl cellulose, hydroxyethylcellulose, carboxymethylcellulose, and polyvinyl alcohol. Among these binders, it is preferable to use methylcellulose together with hydroxypropoxyl cellulose. It is preferable that a content of the organic binder is from 1 to 10 parts by mass to 100 parts by mass of the ceramic raw material.

There is not any special restriction on the pore former as long as the pore former form pores after fired, and examples of the pore former include starch, a foamable resin, a water absorbable resin, and silica gel. It is preferable that a content of the pore former is from 1 to 10 parts by mass to 100 parts by mass of the ceramic raw material.

As the surfactant, ethylene glycol, dextrin, fatty acid soap, polyalcohol or the like is usable. One of these surfactants may be used alone, or a combination of two or more of them may be used. It is preferable that a content of the surfactant is from 0.1 to 5 parts by mass to 100 parts by mass of the ceramic raw material.

It is preferable that a content of the dispersing medium is from 30 to 150 parts by mass to 100 parts by mass of the ceramic raw material.

An example of the method of kneading the forming raw material to form the kneaded material is a method using, for example, a kneader, a vacuum pugmill or the like. The extrusion can be performed by using an extruding die in which there are formed slits corresponding to a cross-sectional shape of the honeycomb formed body.

(2-2) Cell Deforming Step:

Next, as required, there may be performed the cell deforming step of pushing a member having pointed tips, e.g., a frog (hereinafter referred to as "a cell deforming member" sometimes) onto a first end face side of the obtained honeycomb formed body to partially deform a shape of the predetermined cells. By performing this cell deforming step, as to each of the cells having open ends in a range of 1 to 80% of an area of the first end face of the honeycomb formed body, its "maximum inscribed circle change ratio" and "an internal maximum inscribed circle change ratio" of a range of 20 mm or less from the first end face can be adjusted into 1 to 80%. That is, by performing this cell deforming step, the cells having the open ends in the range of 1 to 80% of the area of the first end face of the honeycomb formed body can be deformed into the specific open cells having the open changing portions only in the range of 20 mm or less from the first end face. For example, there are adjusted a shape and length of each tip of the cell deforming member, a range in which the member is pushed onto the first end face side, and the like, so that it is possible to form the specific open cells of a desirable shape. It is to be noted that the predetermined cells can be deformed into the specific open cells during drying or firing in the firing step which will be described later. Consequently, the cell deforming step may be performed as required. Furthermore, the cell deforming step may be performed to the honeycomb dried body which is the dried honeycomb formed body as described above.

(2-3) Firing Step:

The firing step is a step of firing the honeycomb formed body to obtain the honeycomb structure. The obtained honeycomb formed body may be dried with, for example, microwaves and hot air before the honeycomb formed body is fired. Furthermore, in a case where the honeycomb structure to be manufactured includes the plugging portions, the open ends of the cells may be plugged with a material similar to the material used in preparation of the honeycomb formed body to prepare the plugging portions after the honeycomb formed body is dried. The honeycomb formed body may further be dried after the plugging portions are prepared.

It is possible to suitably determine a firing temperature during the firing of the honeycomb formed body in accordance with the material of the honeycomb formed body. For example, in a case where the material of the honeycomb formed body is cordierite, the firing temperature is preferably from 1380 to 1450° C. and further preferably from 1400 to 1440° C. Furthermore, it is preferable to adjust the firing time as keeping time at the highest temperature into about 4 to 6 hours.

Figure 10A:
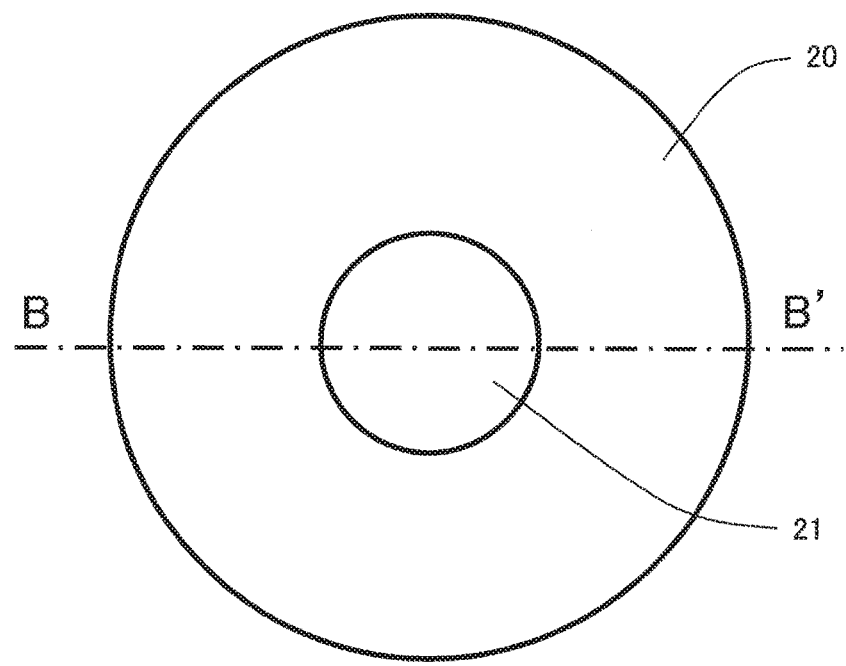
FIG. 10A is a view schematically showing an example of a setter on which a honeycomb formed body is mounted.
Figure 10A:
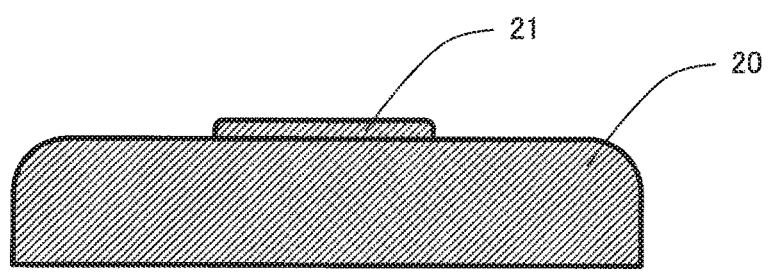
Figure 10B:
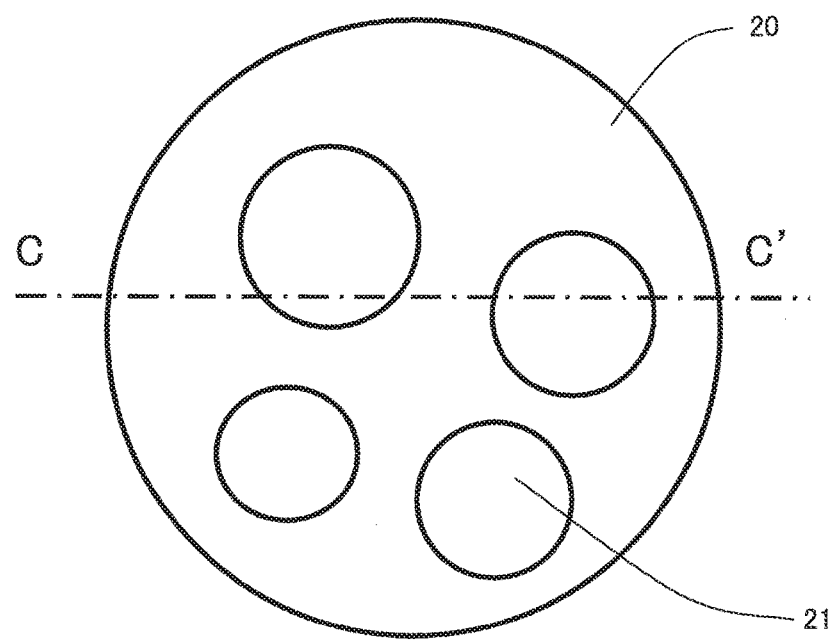
FIG. 10B is a view schematically showing another example of the setter on which the honeycomb formed body is mounted.
Figure 10B:
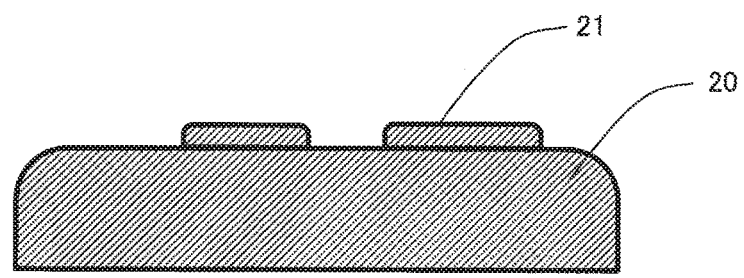
Figure 10C:
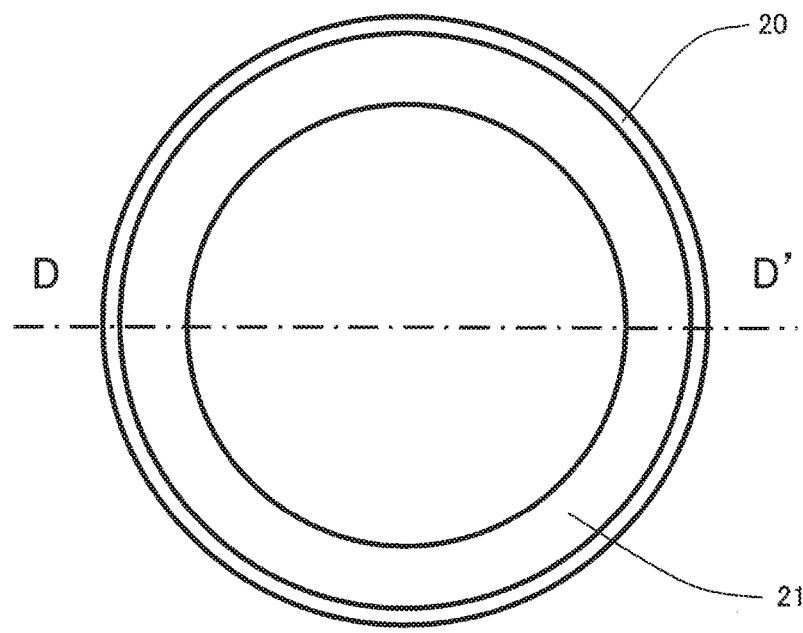
FIG. 10C is a view schematically showing still another example of the setter on which the honeycomb formed body is mounted.
Figure 10C:
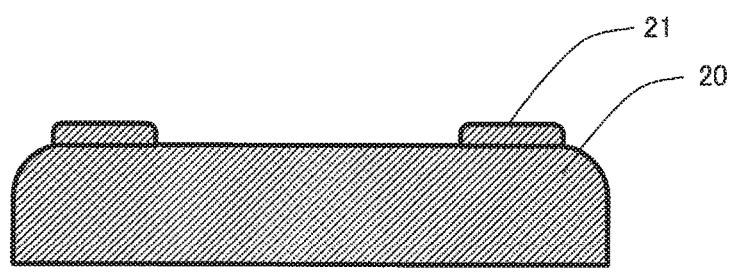
Figure 10D:
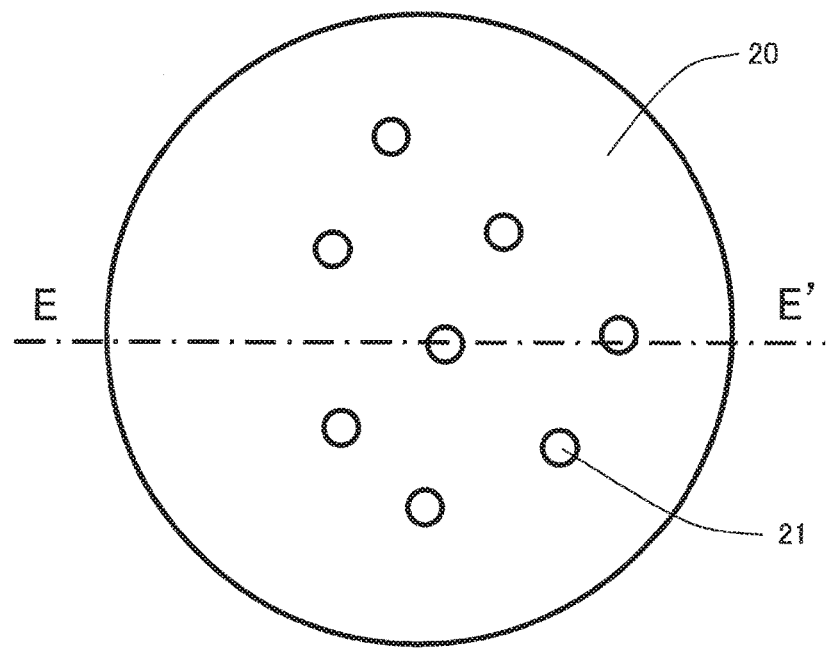
FIG. 10D is a view schematically showing a further example of the setter on which the honeycomb formed body is mounted.
Figure 10D:
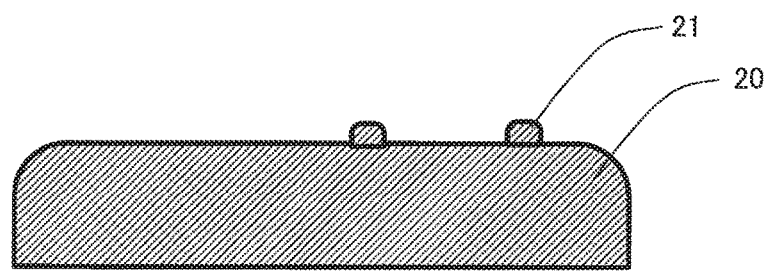
Figure 10E:
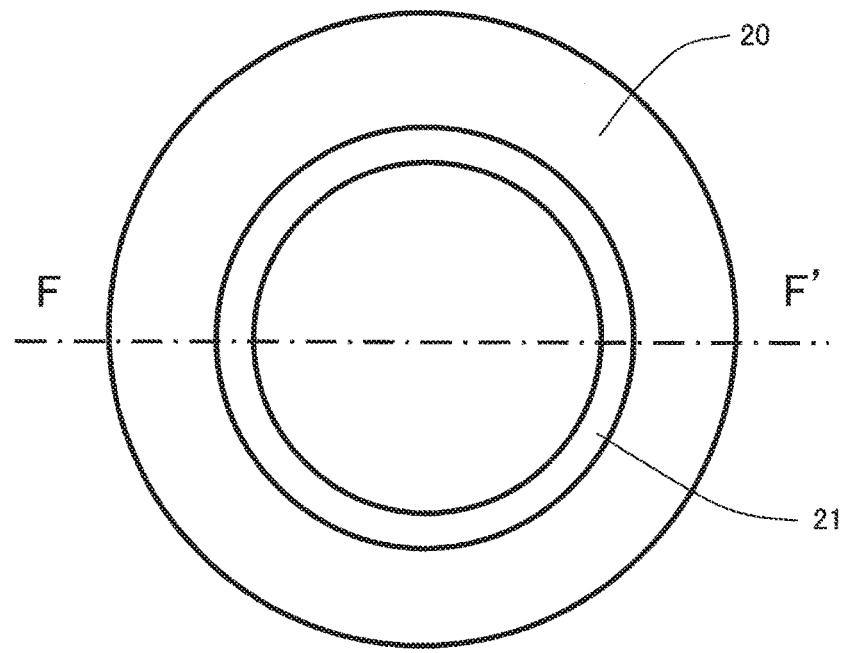
FIG. 10E is a view schematically showing a still further example of the setter on which the honeycomb formed body is mounted.
Figure 10E:
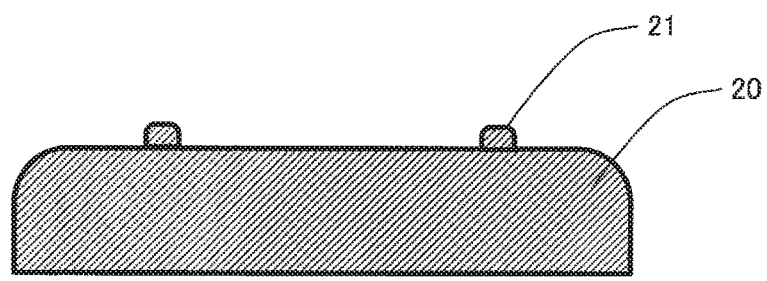

Here, when performing the firing step, it is preferable to mount the honeycomb formed body on a setter 20 having such a shape as shown in, for example, FIG. 10A to FIG. 10E so that the first end face side of the honeycomb formed body is directed downward, thereby performing the firing without using a conventional firing setter for use in the firing of the honeycomb formed body. FIG. 10A to FIG. 10E are views each schematically showing the setter on which the honeycomb formed body is to be mounted. In each of FIG. 10A to FIG. 10E, (a) shows a top plan view of the setter (the surface on which the honeycomb formed body is mounted). Furthermore, (b) of FIG. 10A shows a cross section taken along the line B-B' of (a), (b) of FIG. 10B shows a cross section taken along the line C-C' of (a), (b) of FIG. 10C shows a cross section taken along the line D-D' of (a), (b) of FIG. 10D shows a cross section taken along the line E-E' of (a), and (b) of FIG. 10E shows a cross section taken along the line F-F' of (a).

In a normal firing step, the honeycomb formed body is mounted on a shelf plate in a state where the first end face side is directed downward, and the honeycomb formed body is thrown together with the shelf plate into a firing furnace. At this time, for the purpose of preventing the honeycomb formed body from adhering to the shelf plate, a firing floor plate called "the setter" is interposed between the shelf plate and the honeycomb formed body. Heretofore, as the setter to fire the honeycomb formed body, there has been used, for example, a cut honeycomb structure obtained by firing and cutting the honeycomb formed body. In the firing step during the manufacturing of the honeycomb structure of the present invention, it is preferable to use the setter having a special shape as shown in each of FIG. 10A to FIG. 10E. The setter for use in the firing step may be an unfired setter (hereinafter referred to as "the raw setter" sometimes) or a setter which has been fired (hereinafter referred to as "the fired setter" sometimes). In the case of the raw setter, a suitable example of a material of the setter is the same material as in the honeycomb formed body. Furthermore, in the case of the fired setter, suitable examples of the material of the setter include cordierite, alumina, and mullite. However, the material of the setter may be a material other than the above material.

As shown in FIG. 10A to FIG. 10E, the setter 20 has a convex portion 21 on its surface (its upper surface) on which the first end face of the honeycomb formed body is disposed.

Further, it is preferable to dry and fire the honeycomb formed body in a state where the convex portion 21 is in contact with the first end face of the honeycomb formed body. The firing step is performed by this method, so that it is possible to selectively deform the shape of the cells in a region which comes in contact with the convex portion 21. That is, as to the cells having the open ends in the range of 1 to 80% of the area of the first end face of the honeycomb formed body, "the maximum inscribed circle change ratio" and "the internal maximum inscribed circle change ratio" of the range of 20 mm or less from the first end face can be adjusted into 1 to 80%. For example, in a case of using the setter 20 of FIG. 10A, it is possible to selectively manufacture the honeycomb structure 100 shown in FIG. 8A. Similarly, in a case of using respective setters 20 shown in FIG. 10B to FIG. 10E, it is possible to selectively manufacture honeycomb structures 100 shown in FIG. 8B to FIG. 8E, respectively.

The honeycomb structure is manufactured as described above, so that it is possible to simply manufacture the honeycomb structure of the present invention. It is to be noted that the method of manufacturing the honeycomb structure of the present invention is not limited to the hitherto described manufacturing method as long as a honeycomb structure satisfying the constitution of the honeycomb structure of the present invention can be manufactured.

EXAMPLES

Example 1

To 100 parts by mass of cordierite forming raw material, there were added 0.5 part by mass of pore former, 33 parts by mass of dispersing medium and 5.6 parts by mass of organic binder, respectively, followed by mixing and kneading to prepare a kneaded material. As the cordierite forming raw material, there were used alumina, aluminum hydroxide, kaolin, talc, and silica. Water was used as the dispersing medium, a water absorbable polymer having an average particle diameter of 10 to 50 μm was used as the pore former, methylcellulose was used as the organic binder, and dextrin was used as a dispersing agent.

Next, the kneaded material was extruded by using a predetermined die, to obtain a honeycomb formed body in which a cell shape was quadrangular and the whole shape was a round pillar shape.

Next, the honeycomb formed body was mounted on a fired setter made of alumina so that a first end face of a honeycomb structure to be prepared was directed downward. As the fired setter, there was used a setter having a convex portion in a part of a surface (an upper surface) on which a first end face of a honeycomb structure body was to be disposed. Specifically, in Example 1, for the purpose of forming specific open cells in a range similar to a presence range of specific open cells in a honeycomb structure shown in FIG. 8A, a fired setter having a convex portion in its corresponding portion was used. Further, the honeycomb formed body was dried in a hot air drier. Drying conditions were set at 95 to 145° C.

Next, the dried honeycomb formed body was fired in a tunnel kiln (a continuous firing furnace). As firing conditions, the honeycomb formed body was fired at 1350 to 1440° C. for 10 hours to obtain a honeycomb fired body.

The obtained honeycomb structure had a round pillar shape in which a cross-sectional shape perpendicular to a cell extending direction of the honeycomb structure was round. In Table 1, a column of "the cross-sectional shape" shows the cross-sectional shape of the honeycomb structure which is perpendicular to the cell extending direction.

TABLE 1

| | Cell structure | | | | | | | | | |
|---|---|---|---|---|---|---|---|---|---|---|
| | Thickness of partition walls of central region (μm) | Thickness of partition walls of circumferential region (μm) | Cell density (cells/cm²) | Cell shape | Porosity (%) | Cross-sectional shape | Dia. (mm) | Long dia. (mm) | Short dia. (mm) | Total length (mm) |
| Example 1 | 50 | 70 | 93 | Quadrangular | 27 | Round | 105.7 | — | — | 81.2 |
| Example 2 | 50 | 70 | 93 | Quadrangular | 35 | Round | 105.7 | — | — | 81.2 |
| Example 3 | 64 | 64 | 93 | Quadrangular | 27 | Round | 76.2 | — | — | 50.0 |
| Example 4 | 64 | 64 | 93 | Quadrangular | 35 | Round | 129.0 | — | — | 100.0 |
| Example 5 | 64 | 64 | 139.5 | Quadrangular | 27 | Round | 93.0 | — | — | 125.0 |
| Example 6 | 64 | 90 | 139.5 | Quadrangular | 35 | Round | 105.7 | — | — | 114.0 |
| Example 7 | 90 | 90 | 93 | Quadrangular | 35 | Round | 110.0 | — | — | 91.2 |
| Example 8 | 90 | 110 | 93 | Quadrangular | 55 | Round | 105.7 | — | — | 81.2 |
| Example 9 | 110 | 110 | 62 | Quadrangular | 35 | Round | 118.4 | — | — | 118.4 |
| Example 10 | 110 | 110 | 93 | Quadrangular | 35 | Round | 118.4 | — | — | 91.0 |
| Example 11 | 170 | 170 | 62 | Quadrangular | 35 | Round | 190.5 | — | — | 114.3 |
| Example 12 | 132 | 132 | 46.5 | Quadrangular | 35 | Round | 355.6 | — | — | 101.6 |
| Example 13 | 203 | 203 | 46.5 | Quadrangular | 35 | Round | 143.8 | — | — | 76.2 |
| Example 14 | 170 | 170 | 62 | Quadrangular | 35 | Elliptic | — | 228.6 | 137.2 | 152.4 |
| Example 15 | 165 | 165 | 62 | Quadrangular | 35 | Elliptic | — | 95.0 | 70.0 | 125.0 |
| Example 16 | 300 | 300 | 31 | Quadrangular | 35 | Trapezoidal | — | 122.0 | 104.0 | 100.0 |
| Example 17 | 300 | 300 | 46.5 | Quadrangular | 35 | Elliptic | — | 169.7 | 80.8 | 150 |
| Example 18 | 170 | 170 | 62 | Quadrangular | 35 | Round | 143.8 | — | — | 120 |

A diameter of the cross section of the honeycomb structure which was perpendicular to the cell extending direction was 105.7 mm and a length of the honeycomb structure in the cell extending direction was 81.2 mm. In Table 1, columns of "the diameter (mm)" and "a total length (mm)" show the diameter of the cross section of the honeycomb structure which is perpendicular to the cell extending direction and the length of the honeycomb structure in the cell extending direction.

In the honeycomb structure, a thickness of partition walls of a central region was 50 μm and a thickness of partition walls of a circumferential region was 70 μm. It is to be noted that the thickness of the partition walls of the central region is an average value of the thicknesses of the partition walls which are present in a range excluding 10 cells from a circumferential wall. The thickness of the partition walls of the circumferential region is an average value of the thicknesses of the partition walls which are present in a range of 10 cells from the circumferential wall. In Table 1, columns of "the thickness (μm) of the partition walls of the central region" and "the thickness (μm) of the partition walls of the circumferential region" of "a cell structure" show the thickness of the partition walls.

A shape of open ends of the cells in a second end face of the honeycomb structure was quadrangular. A cell density of the honeycomb structure was 93 cells/cm². Table 1 shows "the cell shape" and "the cell density" of the honeycomb structure. A porosity of the partition walls constituting the honeycomb structure was 27%. The porosity of the partition walls was measured with a mercury porosimeter (Autopore 9500 (tradename)) manufactured by Micromeritics Instrument Corporation. Table 1 shows the porosity of the partition walls.

As to the obtained honeycomb structure, "an area ratio (%) of the specific open cells" were obtained by the following method. First, the first end face and second end face of the honeycomb structure were imaged by an image measuring instrument. Images of the imaged first end face and second end face were image-analyzed, thereby measuring "a diameter D1 of an inscribed circle" and "a diameter D2 of an inscribed circle". In the image analysis, there was used "VM-2520 (tradename)" manufactured by Nikon Corporation. Furthermore, the honeycomb structure was cut at intervals of 5 mm from the first end face and cut surfaces thereof were imaged by an image measuring instrument. Further, images of the imaged cut surfaces were successively image-analyzed, thereby measuring "a diameter D3 of an inscribed circle" which came in contact with a peripheral edge of the cell. Further, on the basis of the measurement results of "the diameter D1 of the inscribed circle", "the diameter D2 of the inscribed circle" and "the diameter D3 of the inscribed circle", it was judged whether or not each of all the cells formed in the honeycomb structure was the specific open cell. Further, there was calculated a percentage of a total area of the cells classified as the specific open cells to the whole area of the first end face of the honeycomb structure body, and the calculated value was defined as "an area ratio (%) of the specific open cells". Table 2 shows "the area ratio (%) of the specific open cells".

TABLE 2

| | Area ratio (%) of specific open cells | Maximum inscribed circle change ratio (%) | | Internal maximum inscribed circle change ratio (20 mm position) (%) | | Length of open changing portion from first end face (mm) | Purifying performance | Pressure loss |
|---|---|---|---|---|---|---|---|---|
| | | Maximum value | Minimum value | Maximum value | Minimum value | | | |
| Example 1 | 80 | 80 | 1 | 0 | 0 | 5 | B | B |
| Example 2 | 70 | 60 | 1 | 0 | 0 | 10 | A | B |

TABLE 2-continued

|  | Area ratio (%) of specific open cells | Maximum inscribed circle change ratio (%) | | Internal maximum inscribed circle change ratio (20 mm position) (%) | | Length of open changing portion from first end face (mm) | Purifying performance | Pressure loss |
| --- | --- | --- | --- | --- | --- | --- | --- | --- |
|  |  | Maximum value | Minimum value | Maximum value | Minimum value |  |  |  |
| Example 3 | 3 | 40 | 1 | 0 | 0 | 15 | A | A |
| Example 4 | 50 | 20 | 1 | 20 | 1 | 20 | A | B |
| Example 5 | 40 | 10 | 1 | 5 | 1 | 20 | A | B |
| Example 6 | 30 | 5 | 1 | 5 | 1 | 20 | B | A |
| Example 7 | 20 | 3 | 1 | 2 | 1 | 20 | B | A |
| Example 8 | 10 | 75 | 60 | 0 | 0 | 10 | A | A |
| Example 9 | 8 | 60 | 40 | 40 | 20 | 20 | B | A |
| Example 10 | 5 | 40 | 20 | 40 | 20 | 20 | B | A |
| Example 11 | 1 | 80 | 60 | 50 | 30 | 20 | B | A |
| Example 12 | 40 | 60 | 20 | 0 | 0 | 1 | B | A |
| Example 13 | 30 | 50 | 10 | 0 | 0 | 3 | B | A |
| Example 14 | 40 | 60 | 30 | 0 | 0 | 15 | A | A |
| Example 15 | 50 | 70 | 40 | 0 | 0 | 10 | A | B |
| Example 16 | 30 | 10 | 2 | 0 | 0 | 15 | A | A |
| Example 17 | 30 | 30 | 8 | 15 | 4 | 20 | A | B |
| Example 18 | 10 | 50 | 3 | 50 | 3 | 20 | B | A |

Furthermore, on the basis of the measurement results of "the diameter D1 of the inscribed circle", "the diameter D2 of the inscribed circle" and "the diameter D3 of the inscribed circle", "a maximum inscribed circle change ratio" and "an internal maximum inscribed circle change ratio" of each specific open cell were obtained. Table 2 shows "a maximum value" and "a minimum value" of each of "the maximum inscribed circle change ratio" and "the internal maximum inscribed circle change ratio" of each specific open cell.

Furthermore, on the basis of the measurement results of "the diameter D1 of the inscribed circle", "the diameter D2 of the inscribed circle" and "the diameter D3 of the inscribed circle", a length (mm) of an open changing portion from the first end face was obtained. Table 2 shows "the length (mm) of the open changing portion from the first end face".

Furthermore, as to the obtained honeycomb structure, a purifying performance and pressure loss were evaluated by the following method. Table 2 shows the evaluation results. Additionally, in the evaluations of the purifying performance and the pressure loss, the first end face of the honeycomb structure was defined as an inflow end face into which a gas flowed and the second end face of the honeycomb structure was defined as an outflow end face from which the gas flowed.

(Purifying Performance)

First, a three-way catalyst was loaded onto the partition walls of the honeycomb structure by a dipping method to obtain the honeycomb catalyst body. An amount of the three-way catalyst to be loaded was adjusted into 200 g/L.

The honeycomb structure (specifically the honeycomb catalyst body) obtained as described above and canned in a can member was attached to an exhaust tube of a gasoline engine of a displacement of 2.0 L. During run in an exhaust gas regulation mode (JC-08), an exhaust gas was sampled from a pipe connected to the exhaust tube and stored in a so-called bag, and the stored exhaust gas was passed through an analyzer after the run ended, thereby measuring HC emissions. The measurement of the HC emissions was performed by a method stipulated in JC-08. As the exhaust gas analyzer, "MEXA9100EGR manufactured by HORIBA, Ltd." was used. On the basis of the following evaluation standards, the purifying performance was evaluated. In the following evaluation standards, an improvement ratio of the purifying performance to such "a reference honeycomb structure" as described below was defined as a judgment standard. The improvement ratio of the purifying performance is represented by Equation (a) mentioned below. "The reference honeycomb structure" is a honeycomb structure in which there is not any change in the cell shape from the first end face to the second end face and which has the same cell structure and size as those in a honeycomb structure of an evaluation target. Additionally, when the purifying performance can improve, it is possible to cope with strict exhaust gas regulations in future. Furthermore, it is possible to decrease an amount of a noble metal to be included in the catalyst.

(1−(an HC emission value of the honeycomb structure of each example/an HC emission value of the reference honeycomb structure)×100    Equation (a):

Evaluation A: To the reference honeycomb structure, in the purifying performance, improvement can be seen in excess of 5%.

Evaluation B: To the reference honeycomb structure, in the purifying performance, the improvement can be seen in excess of 2% and in a range of 5% or less.

Evaluation C: To the reference honeycomb structure, the purifying performance is limited to improvement of 2% or less.

(Pressure Loss)

A gas (air) to measure the pressure loss was passed through the honeycomb catalyst body used in the evaluation of the purifying performance at 25° C. and a flow rate of 10 Nm³/min, pressures on a first end face side and a second end face side were measured, respectively, and a pressure difference therebetween was calculated. The calculated pressure difference was defined as the pressure loss of the honeycomb structure. Furthermore, on the basis of the following evaluation standards, the pressure loss was evaluated. In the following evaluation standards, a pressure loss rise ratio to the above-mentioned "reference honeycomb structure" was defined as a judgment standard. The pressure loss rise ratio is represented by Equation (b) mentioned below. When increase of the pressure loss can be inhibited, it is possible to inhibit decrease of an output, and it is possible to expect improvement of fuel efficiency.

(a pressure loss value of the honeycomb structure of each example/a pressure loss value of the reference honeycomb structure)×100   Equation (b):

Evaluation A: To the reference honeycomb structure, the pressure loss rise ratio is within 2%.

Evaluation B: To the reference honeycomb structure, the pressure loss rise ratio is in excess of 2% and in a range of 5% or less.

Evaluation C: To the reference honeycomb structure, the pressure loss rise ratio is in excess of 5%.

Examples 2 to 18

In Examples 2 to 18, the procedure of Example 1 was repeated except that a cell structure, a porosity, a cross-sectional shape, a diameter, a long diameter, a short diameter and a total length were changed as shown in Table 1 and further except that a firing method was changed as follows in each of Examples 2 to 18, to prepare honeycomb structures. Here, "the long diameter" is the longest straight line among straight lines each connecting two points on a circumferential edge of a cross section of the honeycomb structure which is perpendicular to a cell extending direction. Further, "the short diameter" is a straight line perpendicular to the above "long diameter" in the cross section perpendicular to the cell extending direction. In Example 14, the cross-sectional shape of the honeycomb structure was elliptic, the long diameter was 228.6 mm, and the short diameter was 137.2 mm. In Example 15, the cross-sectional shape of the honeycomb structure was elliptic, the long diameter was 95.0 mm, and the short diameter was 70.0 mm. In Example 16, the cross-sectional shape of the honeycomb structure was trapezoidal, the long diameter was 122.0 mm, and the short diameter was 104.0 mm. In Example 17, the cross-sectional shape of the honeycomb structure was trapezoidal, the long diameter was 169.7 mm, and the short diameter was 80.8 mm.

Furthermore, as to the honeycomb structures of Examples 2 to 18, on the basis of the measurement results of "a diameter D1 of an inscribed circle", "a diameter D2 of an inscribed circle" and "a diameter D3 of an inscribed circle", "a maximum inscribed circle change ratio" and "an internal maximum inscribed circle change ratio" of each specific open cell were obtained. Table 2 shows "a maximum value" and "a minimum value" of each of "the maximum inscribed circle change ratio" and "the internal maximum inscribed circle change ratio" of each specific open cell. "The internal maximum inscribed circle change ratio" is a value at a position of 20 mm from the first end face.

Furthermore, as to the honeycomb structures of Examples 2 to 18, on the basis of the measurement results of "the diameter D1 of the inscribed circle", "the diameter D2 of the inscribed circle" and "the diameter D3 of the inscribed circle", a length (mm) of an open changing portion from a first end face was obtained. Table 2 shows "the length (mm) of the open changing portion from the first end face". In the honeycomb structures of Examples 1 to 18, the cells other than the specific open cells were "normal cells" constituted so that "the maximum inscribed circle change ratio" and "the internal maximum inscribed circle change ratio" were both smaller than 1%.

In Example 2, for the purpose of forming specific open cells in a range similar to a presence range of specific open cells in a honeycomb structure shown in FIG. 8B, a fired setter having a convex portion in its corresponding portion was used to perform firing, thereby preparing the honeycomb structure.

In Example 3, for the purpose of forming specific open cells in a range similar to a presence range of specific open cells in a honeycomb structure shown in FIG. 8C, a fired setter having a convex portion in its corresponding portion was used to perform firing, thereby preparing the honeycomb structure.

In Example 4, for the purpose of forming specific open cells in a range similar to a presence range of specific open cells in a honeycomb structure shown in FIG. 8D, a fired setter having a convex portion in its corresponding portion was used to perform firing, thereby preparing the honeycomb structure.

In Example 5, for the purpose of forming specific open cells in a range similar to a presence range of specific open cells in a honeycomb structure shown in FIG. 8E, a fired setter having a convex portion in its corresponding portion was used to perform firing, thereby preparing the honeycomb structure.

In each of Examples 6, 11 and 16, for the purpose of forming specific open cells in a range similar to a presence range of specific open cells in a honeycomb structure shown in FIG. 8A, a fired setter having a convex portion in its corresponding portion was used to perform firing, thereby preparing the honeycomb structure.

In each of Examples 7, 12 and 17, for the purpose of forming specific open cells in a range similar to a presence range of specific open cells in a honeycomb structure shown in FIG. 8B, a fired setter having a convex portion in its corresponding portion was used to perform firing, thereby preparing the honeycomb structure.

In each of Examples 8, 13 and 18, for the purpose of forming specific open cells in a range similar to a presence range of specific open cells in a honeycomb structure shown in FIG. 8C, a fired setter having a convex portion in its corresponding portion was used to perform firing, thereby preparing the honeycomb structure.

In each of Examples 9 and 14, for the purpose of forming specific open cells in a range similar to a presence range of specific open cells in a honeycomb structure shown in FIG. 8D, a fired setter having a convex portion in its corresponding portion was used to perform firing, thereby preparing the honeycomb structure.

In each of Examples 10 and 15, for the purpose of forming specific open cells in a range similar to a presence range of specific open cells in a honeycomb structure shown in FIG. 8E, a fired setter having a convex portion in its corresponding portion was used to perform firing, thereby preparing the honeycomb structure.

Comparative Examples 1 to 11

In Comparative Examples 1 to 11, the procedure of Example 1 was repeated except that a cell structure, a porosity, a cross-sectional shape, a diameter, a long diameter, a short diameter and a total length were changed as shown in Table 3 and further except that a firing method was changed as follows in Comparative Examples 1 to 11, to prepare honeycomb structures. In Comparative Example 9, the cross-sectional shape of the honeycomb structure was elliptic, the long diameter was 228.6 mm, and the short diameter was 137.2 mm.

Furthermore, as to the honeycomb structures of Comparative Examples 1 to 11, on the basis of the measurement results of "a diameter D1 of an inscribed circle", "a diameter D2 of an inscribed circle" and "a diameter D3 of an inscribed circle", "a maximum inscribed circle change ratio" and "an internal maximum inscribed circle change ratio" of each specific open cell were obtained. Table 4 shows "a maximum value" and "a minimum value" of each of "the maximum inscribed circle change ratio" and "the internal maximum inscribed circle change ratio" of each specific open cell.

Furthermore, as to the honeycomb structures of Comparative Examples 1 to 11, on the basis of the measurement results of "the diameter D1 of the inscribed circle", "the diameter D2 of the inscribed circle" and "the diameter D3 of the inscribed circle", a length (mm) of an open changing portion from a first end face was obtained. Table 4 shows "the length (mm) of the open changing portion from the first end face".

TABLE 3

| | Cell structure | | | | | | | | |
|---|---|---|---|---|---|---|---|---|---|
| | Thickness of partition walls of central region (μm) | Thickness of partition walls of circumferential region (μm) | Cell density (cells/cm²) | Cell shape | Porosity (%) | Cross-sectional shape | Dia. (mm) | Long dia. (mm) | Short dia. (mm) | Total length (mm) |
| Comparative Example 1 | 64 | 64 | 93 | Quadrangular | 27 | Round | 105.7 | — | — | 81.2 |
| Comparative Example 2 | 64 | 64 | 139.5 | Quadrangular | 27 | Round | 93.0 | — | — | 125.0 |
| Comparative Example 3 | 64 | 90 | 139.5 | Quadrangular | 35 | Round | 105.7 | — | — | 114.0 |
| Comparative Example 4 | 90 | 90 | 93 | Quadrangular | 35 | Round | 110.0 | — | — | 91.2 |
| Comparative Example 5 | 110 | 110 | 62 | Quadrangular | 35 | Round | 118.4 | — | — | 118.4 |
| Comparative Example 6 | 110 | 110 | 93 | Quadrangular | 35 | Round | 118.4 | — | — | 91.0 |
| Comparative Example 7 | 170 | 170 | 62 | Quadrangular | 35 | Round | 190.5 | — | — | 114.3 |
| Comparative Example 8 | 132 | 132 | 46.5 | Quadrangular | 35 | Round | 355.6 | — | — | 101.6 |
| Comparative Example 9 | 170 | 170 | 62 | Quadrangular | 35 | Elliptic | — | 228.6 | 137.2 | 152.4 |
| Comparative Example 10 | 64 | 90 | 93 | Quadrangular | 35 | Round | 105.7 | — | — | 114.0 |
| Comparative Example 11 | 203 | 203 | 46.5 | Quadrangular | 35 | Round | 143.8 | — | — | 76.2 |

TABLE 4

| | Area ratio (%) of specific open cells | Maximum inscribed circle change ratio (%) | | Internal maximum inscribed circle change ratio (20 mm position) (%) | | Length of open changing portion from first end face (mm) | Purifying performance | Pressure loss |
|---|---|---|---|---|---|---|---|---|
| | | Maximum value | Minimum value | Maximum value | Minimum value | | | |
| Comparative Example 1 | 0 | 0 | 0 | 0 | 0 | 0 | C | A |
| Comparative Example 2 | 0 | 0 | 0 | 0 | 0 | 0 | C | A |
| Comparative Example 3 | 0 | 0 | 0 | 0 | 0 | 0 | C | A |
| Comparative Example 4 | 85 | 80 | 1 | 0 | 0 | 5 | B | C |
| Comparative Example 5 | 90 | 80 | 1 | 0 | 0 | 10 | B | C |
| Comparative Example 6 | 100 | 50 | 10 | 40 | 10 | 20 | A | C |
| Comparative Example 7 | 60 | 85 | 1 | 0 | 0 | 5 | B | C |
| Comparative Example 8 | 60 | 90 | 1 | 70 | 1 | 20 | A | C |
| Comparative Example 9 | 60 | 100 | 1 | 0 | 0 | 10 | B | C |
| Comparative Example 10 | 60 | 50 | 20 | 50 | 20 | 25 | A | C |
| Comparative Example 11 | 30 | 50 | 10 | 50 | 10 | 50 | A | C |

In each of Comparative Examples 1 to 3, firing was performed by using a raw setter in which a surface on a side in contact with a honeycomb formed body did not have any convex portions, to prepare the honeycomb structure.

In each of Comparative Examples 4 and 5, firing was performed by using a fired setter having a convex portion in its corresponding portion to form specific open cells in a region in excess of 80%, thereby preparing the honeycomb structure.

In Comparative Example 6, firing was performed by using a fired setter entirely in contact with a setter surface to form specific open cells in the whole region, thereby preparing the honeycomb structure.

In Comparative Example 7, the honeycomb structure was prepared by the following method to form cells in which inscribed circles are partially enlarged. A fired setter convexed in a region of 60% of FIG. 8A was used, and furthermore, a portion of a honeycomb formed body which had a thickness of 5 mm on a side in contact with a setter surface prior to firing was immersed into a liquid in which cordierite powder was dissolved, followed by the firing, to prepare the honeycomb structure.

In Comparative Example 8, the honeycomb structure was prepared by the following method to form cells in which inscribed circles are partially enlarged. A fired setter convexed in a region of 60% of FIG. 8A was used, and furthermore, a portion of a honeycomb formed body which had a thickness of 20 mm on a side in contact with a setter surface prior to firing was immersed into a liquid in which cordierite powder was dissolved, followed by the firing, to prepare the honeycomb structure.

In Comparative Example 9, the honeycomb structure was prepared by the following method to form cells in which inscribed circles are partially enlarged. A fired setter convexed in a region of 60% of FIG. 8A was used, and furthermore, a portion of a honeycomb formed body which had a thickness of 10 mm on a side in contact with a setter surface prior to firing was immersed into a liquid in which cordierite powder was dissolved, followed by the firing, to prepare the honeycomb structure.

In Comparative Example 10, the honeycomb structure was prepared by the following method to form cells in which inscribed circles are partially enlarged. A fired setter convexed in a region of 60% of FIG. 8A was used, and furthermore, a portion of a honeycomb formed body which had a thickness of 25 mm on a side in contact with a setter surface prior to firing was immersed into a liquid in which cordierite powder was dissolved, followed by the firing, to prepare the honeycomb structure.

In Comparative Example 11, the honeycomb structure was prepared by the following method to form cells in which inscribed circles are partially enlarged. There was used a fired setter convexed in a region of 30% of FIG. 8A, and furthermore, a portion of a honeycomb formed body which had a thickness of 50 mm on a side in contact with a setter surface prior to firing was immersed into a liquid in which cordierite powder was dissolved, followed by the firing, to prepare the honeycomb structure.

Furthermore, as to the honeycomb structures of Examples 2 to 18 and Comparative Examples 1 to 11, a purifying performance and pressure loss were evaluated by a method similar to Example 1. Table 4 shows the evaluation results.

(Result)

As shown in Table 2, in the honeycomb structures, there was confirmed the tendency that the larger the maximum inscribed circle change ratio (%) and the internal maximum inscribed circle change ratio (%) were, the more the purifying performance improved. Furthermore, when the area ratio of the specific open cells was in a range of 1 to 80%, the pressure loss was small, and the honeycomb structure was suitably usable as an exhaust gas purifying catalyst carrier. Furthermore, when the length of the open changing portion from the first end face was 20 mm or less, it was possible to inhibit the increase of the pressure loss while maintaining a sufficient purifying performance as the exhaust gas purifying catalyst carrier.

As shown in Table 4, in the honeycomb structures of Comparative Examples 1 to 3, any specific open cells were not present and the purifying performance deteriorated. In the honeycomb structures of Comparative Examples 4 to 6, the area ratio of the specific open cells was in excess of 80% and the pressure loss remarkably increased. In the honeycomb structure of Comparative Examples 7 to 9, the maximum inscribed circle change ratio (%) and the internal maximum inscribed circle change ratio (%) were in excess of 80% and the pressure loss remarkably increased. In the honeycomb structures of Comparative Examples 10 and 11, the length of the open changing portion from the first end face was in excess of 20 mm and the pressure loss remarkably increased.

A honeycomb structure of the present invention is usable as an exhaust gas purifying catalyst carrier or filter.

DESCRIPTION OF REFERENCE NUMERALS

1: partition wall, 2: cell, 2x: specific open cell, 2y: non-specific open cell, 3: circumferential wall, 4: honeycomb structure body, 11: first end face, 12: second end face, 15: open changing portion, 20: setter, 21: convex portion, 100: honeycomb structure, D1a, D1b, D1c, D1d, D1e, D2a, D2b, D2c, D2d, D2e, D3a, D3b, D3c, D3d and D3e: diameter of an inscribed circle, and P: range in which the specific open cells are formed.

What is claimed is:
1. A honeycomb structure comprising:
   a pillar-shaped honeycomb structure body having porous partition walls defining a plurality of cells extending from a first end face to a second end face to become through channels for fluid; and
   a porous circumferential wall formed to surround a circumference of the honeycomb structure body,
   wherein each of the plurality of cells excluding the cells formed at an outermost circumference has a quadrangular or triangular cross-sectional shape,
   wherein 1 to 80% of an area of the first end face of the honeycomb structure body is defined by specific open cells, with each of the specific open cells having an open changing portion,
   in the open changing portion, a diameter D2 of an inscribed circle which comes in contact with a peripheral edge of the open end of a cell in the second end face and a diameter D1 of an inscribed circle which comes in contact with a peripheral edge of the open end of a cell in the first end face satisfy a maximum inscribed circle changing ratio relation of $1 \le |(1-(D1/D2)) \times 100| \le 80$, and
   the diameter D2 of the inscribed circle which comes in contact with the peripheral edge of the open end of a cell in the second end face and a diameter D3 of an inscribed circle which comes in contact with a peripheral edge of a cell in a cross section perpendicular to a direction from the first end face toward the second end face satisfy an internal maximum inscribed circle change ratio relation of $1 \leq |(1-(D3/D2)) \times 100| \leq 80$ in a range of a part of 20 mm or less from the first end face, the open changing portion of a specific open cell is present only in a range of the specific open cell which is 20 mm or less from the first end face, and among the plurality of cells, the cells other than the specific open cells are non-specific open cells which do not have the open changing portions and in which a size of an open end of each cell does not change or the maximum inscribed circle change ratio in the open end of each non-specific open cell is smaller than that in the open changing portion of the specific open cell, wherein the maximum inscribed circle change ratio in the open end of each non-specific cell is $|(1-(D1/D2)) \times 100|$ wherein D2 is a diameter of an inscribed circle which comes in contact with a peripheral edge of a non-specific open cell in the second end face and D1 is a diameter of an inscribed circle which comes in contact with a peripheral edge of an open end of the non-specific cell in the first end face.

2. The honeycomb structure according to claim 1, wherein in a specific open cell, the diameter D2 of the inscribed circle which comes in contact with the peripheral edge of the open end of a cell in the second end face and a diameter D3X of an inscribed circle which comes in contact with a peripheral edge of a cell of a range which is in excess of 20 mm from the first end face in the cross section perpendicular to the direction from the first end face toward the second end face satisfy a relation of $|(1-(D3X/D2)) \times 100| < 1$.

3. The honeycomb structure according to claim 1, wherein among the cells, the cells other than the specific open cells are normal cells, in each of the normal cells, the diameter D2 of the inscribed circle which comes in contact with the peripheral edge of the open end of a cell in the second end face and the diameter D1 of the inscribed circle which comes in contact with the peripheral edge of the open end of a cell in the first end face satisfy a relation of $|(1-(D1/D2)) \times 100| < 1$, and the diameter D2 of the inscribed circle which comes in contact with the peripheral edge of the open end of a cell in the second end face and the diameter D3 of the inscribed circle which comes in contact with the peripheral edge of a cell in the cross section perpendicular to the direction from the first end face toward the second end face satisfy a relation of $|(1-(D3/D2)) \times 100| < 1$.

4. The honeycomb structure according to claim 1, wherein among the plurality of cells, cells having open ends in a range of 3 to 70% of the area of the first end face of the honeycomb structure body are the specific open cells.

5. The honeycomb structure according to claim 1, wherein in a specific open cell, the diameter D2 of the inscribed circle and the diameter D1 of the inscribed circle satisfy a relation of $3 \leq |(1-(D1/D2)) \times 100| \leq 70$, and the diameter D2 of the inscribed circle and the diameter D3 of the inscribed circle in the open changing portion satisfy a relation of $3 \leq |(1-(D3/D2)) \times 100| \leq 70$.

6. The honeycomb structure according to claim 1, wherein the diameter D2 of the inscribed circle is from 0.5 to 2.2 mm.

7. The honeycomb structure according to claim 1, wherein a thickness of the partition walls is from 40 to 350 μm.

8. The honeycomb structure according to claim 1, wherein a cell density of the honeycomb structure body is from 30 to 200 cells/cm$^2$.

9. The honeycomb structure according to claim 1, wherein the partition walls are constituted by a material including at least one selected from the group consisting of cordierite, silicon carbide, a silicon-silicon carbide based composite material, mullite, alumina, aluminum titanate, silicon nitride, a cordierite forming raw material, lithium aluminum silicate, aluminum titanate, and a silicon carbide-cordierite based composite material.

* * * * *